(12) United States Patent
Wang

(10) Patent No.: US 7,532,235 B2
(45) Date of Patent: May 12, 2009

(54) PHOTOGRAPHIC APPARATUS

(75) Inventor: Shouwei Wang, Asaka (JP)

(73) Assignee: Fujifilm Corporation, Tokyo (JP)

( * ) Notice: Subject to any disclaimer, the term of this patent is extended or adjusted under 35 U.S.C. 154(b) by 545 days.

(21) Appl. No.: 10/972,535

(22) Filed: Oct. 26, 2004

(65) Prior Publication Data
US 2005/0088546 A1    Apr. 28, 2005

(30) Foreign Application Priority Data
Oct. 27, 2003    (JP)    ............... 2003-366317

(51) Int. Cl.
*H04N 5/225*    (2006.01)
*H04N 5/228*    (2006.01)
(52) U.S. Cl. ............... 348/207.99; 348/208.2
(58) Field of Classification Search ......... 382/295, 382/296, 297, 289; 348/207.99, 208.2
See application file for complete search history.

(56) References Cited

U.S. PATENT DOCUMENTS

| | | | | |
|---|---|---|---|---|
| 5,625,848 | A * | 4/1997 | Imanari | ............... 396/50 |
| 6,011,585 | A * | 1/2000 | Anderson | ............... 348/272 |
| 6,238,302 | B1 | 5/2001 | Helmstetter et al. | |
| 6,273,832 | B1 | 8/2001 | Helmstetter et al. | |
| 6,425,831 | B1 | 7/2002 | Heene et al. | |
| 6,471,600 | B2 | 10/2002 | Tang et al. | |
| 6,506,125 | B2 | 1/2003 | Helmstetter et al. | |
| 6,563,535 | B1 * | 5/2003 | Anderson | ............... 348/231.2 |
| 6,606,117 | B1 * | 8/2003 | Windle | ............... 348/239 |
| 6,632,391 | B1 | 10/2003 | Helmstetter et al. | |
| 6,679,782 | B2 | 1/2004 | Tang et al. | |
| 6,873,357 | B2 * | 3/2005 | Fuchimukai et al. | ...... 348/208.2 |
| 6,987,597 | B2 * | 1/2006 | Hewlett et al. | ............... 359/238 |
| 7,265,790 | B2 * | 9/2007 | Battles et al. | ............... 348/374 |
| 7,286,178 | B2 * | 10/2007 | Isoyama | ............... 348/333.02 |
| 7,359,712 | B2 * | 4/2008 | Gutowski et al. | ............... 455/456.1 |
| 7,375,755 | B2 * | 5/2008 | Oya et al. | ............... 348/333.02 |
| 2002/0175880 | A1 * | 11/2002 | Melville et al. | ............... 345/8 |
| 2003/0017885 | A1 | 1/2003 | Heene et al. | |
| 2003/0052985 | A1 * | 3/2003 | Oya et al. | ............... 348/333.02 |
| 2003/0122945 | A1 * | 7/2003 | Muramatsu | ............... 348/239 |

(Continued)

FOREIGN PATENT DOCUMENTS

JP    7-325338    12/1995

(Continued)

*Primary Examiner*—Nhan T Tran
*Assistant Examiner*—Euel K Cowan
(74) *Attorney, Agent, or Firm*—Birch, Stewart, Kolasch & Birch, LLP

(57) ABSTRACT

The photographic apparatus according to the present invention comprises a posture detecting device which detects the posture of a body of the photographic apparatus, a store instructing device which instructs storing of a posture detected by the posture detecting device, a posture storing device for storing the posture detected by the posture detecting device in accordance with an instruction from the store instructing device, a discrepancy extent computing device which compares the posture stored by the posture storing device and the current posture detected by the detecting device, and computes the extent of any discrepancy of the current posture from the posture stored by the posture storing device, and a correction information generating device for generating correction information for correcting the current posture to the posture stored by the posture storing device on the basis of the extent of the discrepancy computed by the discrepancy extent computing device.

27 Claims, 15 Drawing Sheets

U.S. PATENT DOCUMENTS

2003/0189649 A1* 10/2003 Kuno ....................... 348/211.1
2003/0193572 A1* 10/2003 Wilson et al. .......... 348/207.99
2004/0106465 A1    6/2004 Dewanjee et al.
2004/0208114 A1* 10/2004 Lao et al. .................... 369/125

FOREIGN PATENT DOCUMENTS

| JP | 8-294025 | | 5/1996 |
| JP | 2000-155878 | * | 6/2000 |
| JP | 2002-94854 A | | 3/2002 |

* cited by examiner

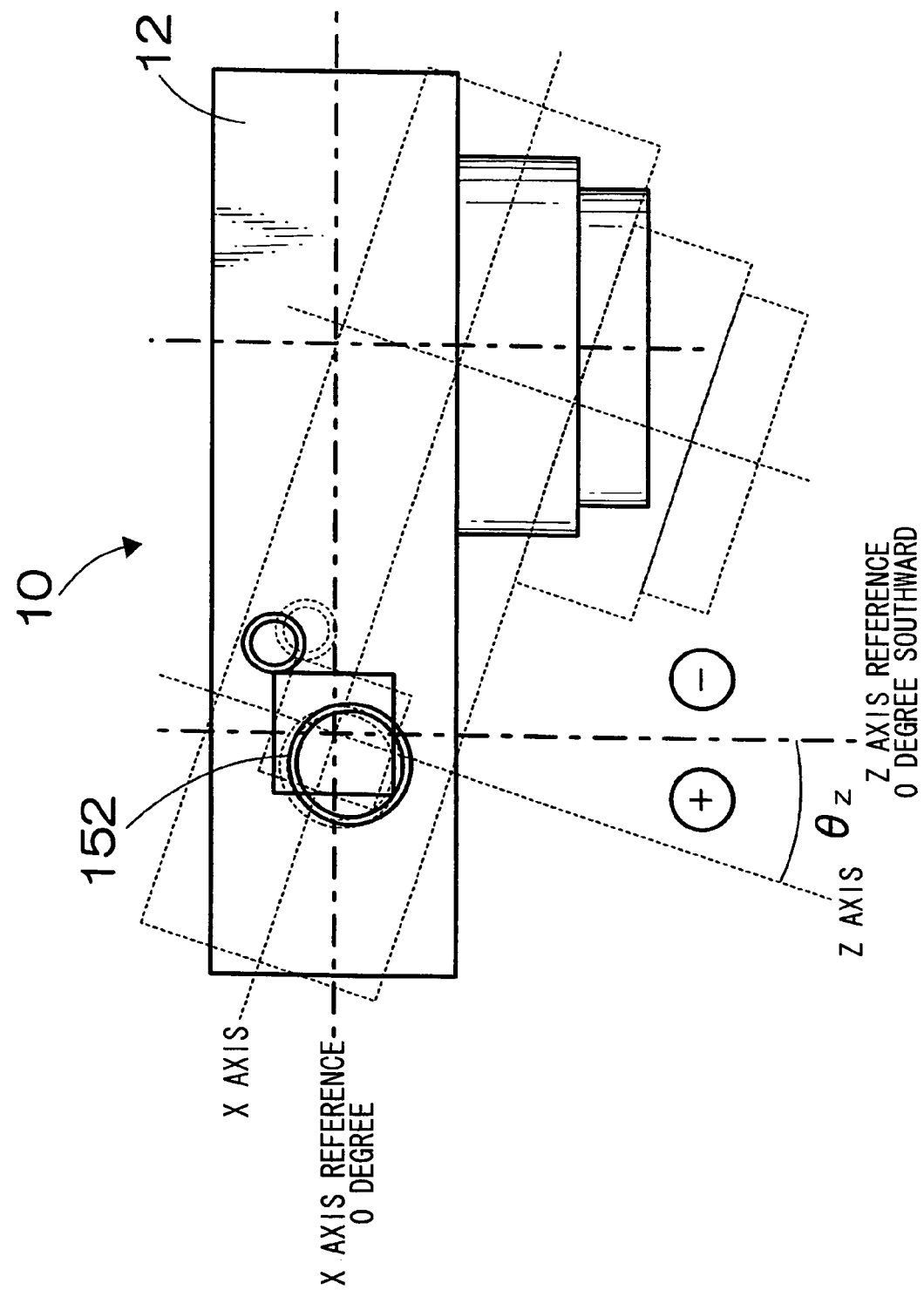

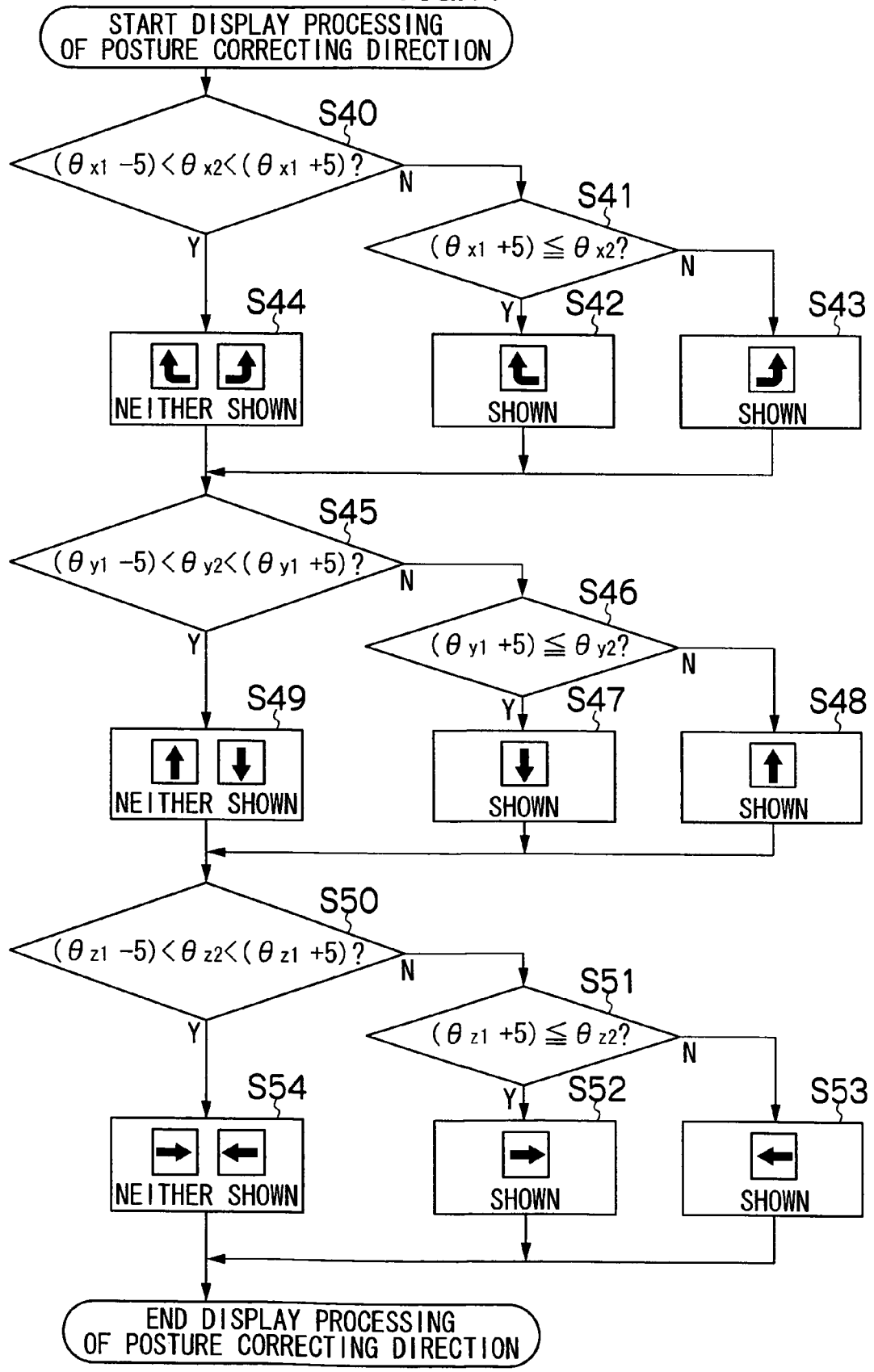

PHOTOGRAPHIC APPARATUS

This Nonprovisional application claims priority under 35 U.S.C. § 119(a) on Patent Application No(s). 2003-366317 filed in Japan on Oct. 27, 2003, the entire contents of which are hereby incorporated by reference.

BACKGROUND OF THE INVENTION

1. Field of the Invention

The present invention relates to a photographic apparatus, and more particularly to a photographic apparatus capable of detecting the posture of its own body.

2. Description of the Related Art

When one visits a tourism resort or the like, he may ask someone else to take a picture with his own camera to make a visual record of the scene in which he himself is present in memory of the trip.

However, this involves a problem that a picture taken by the requested person may have a different composition from the camera owner's own intention, and therefore it is difficult to have a satisfactory picture taken.

In view of this problem, the Japanese Patent Application Publication No. 2002-94854 proposes an idea that the camera owner first takes a picture in a composition of his own choice and, when he asks someone else to take a picture, causes that picture to be superposed over a through image and displayed on the monitor screen, and thereby facilitates shooting of a picture containing his own image in a composition of his own choice.

SUMMARY OF THE INVENTION

However, a through image will become difficult to see if another picture is superposed over it on the monitor screen as proposed by the Japanese Patent Application Publication No. 2002-94854, and this difficulty might rather impede intended picture taking.

Or if the superposed images are not fully consistent with each other, the person asked to take a picture may be confused.

An object of the present invention, attempted in view of these circumstances, is to provide a photographic apparatus which can have a picture in a composition of its owner's own choice taken by anybody else.

In order to achieve the object stated above, according to a first aspect of the present invention, there is provided a photographic apparatus comprising a posture detecting device which detects the posture of a body of the photographic apparatus, a store instructing device which instructs storing of a posture detected by the posture detecting device, a posture storing device for storing the posture detected by the posture detecting device in accordance with an instruction from the store instructing device, a discrepancy extent computing device which compares the posture stored the posture storing device and the current posture detected by the detecting device, and computes the extent of any discrepancy of the current posture from the posture stored by the posture storing device, and a correction information generating device for generating correction information for correcting the current posture to the posture stored by the posture storing device on the basis of the extent of the discrepancy computed by the discrepancy extent computing device.

According to the first aspect of the present invention, when the store instructing device instructs storing of the posture of the body of the photographic apparatus, the posture of the body of the photographic apparatus detected by the posture detecting device is stored by the posture storing device. Then, the extent of any discrepancy of the current posture of the body of the photographic apparatus from the posture stored by this posture storing device is computed by the discrepancy extent computing device, and correction information for correcting the current posture to the posture stored by the storing device on the basis of the computed extent of discrepancy is generated by the correction information generating device. The photographer can take a picture in the same posture as the posture at the time the instruction for storing was issued by the store instructing device by correcting the posture of the body of the photographic apparatus on the basis of the correction information generated by this correction information generating device.

In order to achieve the object stated above, according to a second aspect of the present invention, the correction information generating device according to the first aspect may cause the correcting direction for the posture of the body of the photographic apparatus to be displayed on a display device on the basis of the extent of any discrepancy computed by the discrepancy extent computing device, and correction information to be generated.

According to the second aspect of the present invention, the correcting direction is displayed on the display device. This enables the posture of the body of the photographic apparatus to be readily corrected.

In order to achieve the object stated above according to a third aspect of the present invention, the photographic apparatus according to the second aspect may be an electronic camera which takes a picture with an image pickup element and records the picture so taken on a recording medium as video data, wherein a real-time picture taken by the image pickup element is displayed on the display device, and the correcting direction is superposed over the real-time picture in the display.

According to the third aspect of the present invention, since the correction information is displayed superposed over the real-time picture (through image) displayed on the display device, the person who requests shooting can convey the composition of his own intention more clearly to the requested photographer.

According to the invention, when one requests somebody else to take a picture on his behalf, he can convey his own idea of the picture more clearly to the requested photographer.

BRIEF DESCRIPTION OF THE DRAWINGS

FIG. 7 illustrates the detecting angle of the posture detecting sensor in still another way;

FIG. 11 is a flow chart of the procedure of display processing of the correcting direction;

DETAILED DESCRIPTION OF THE PREFERRED EMBODIMENTS

Preferred embodiments of the present invention realized in one or another form of photographic apparatus will be described below with reference to the accompanying drawings.

Figure 1:
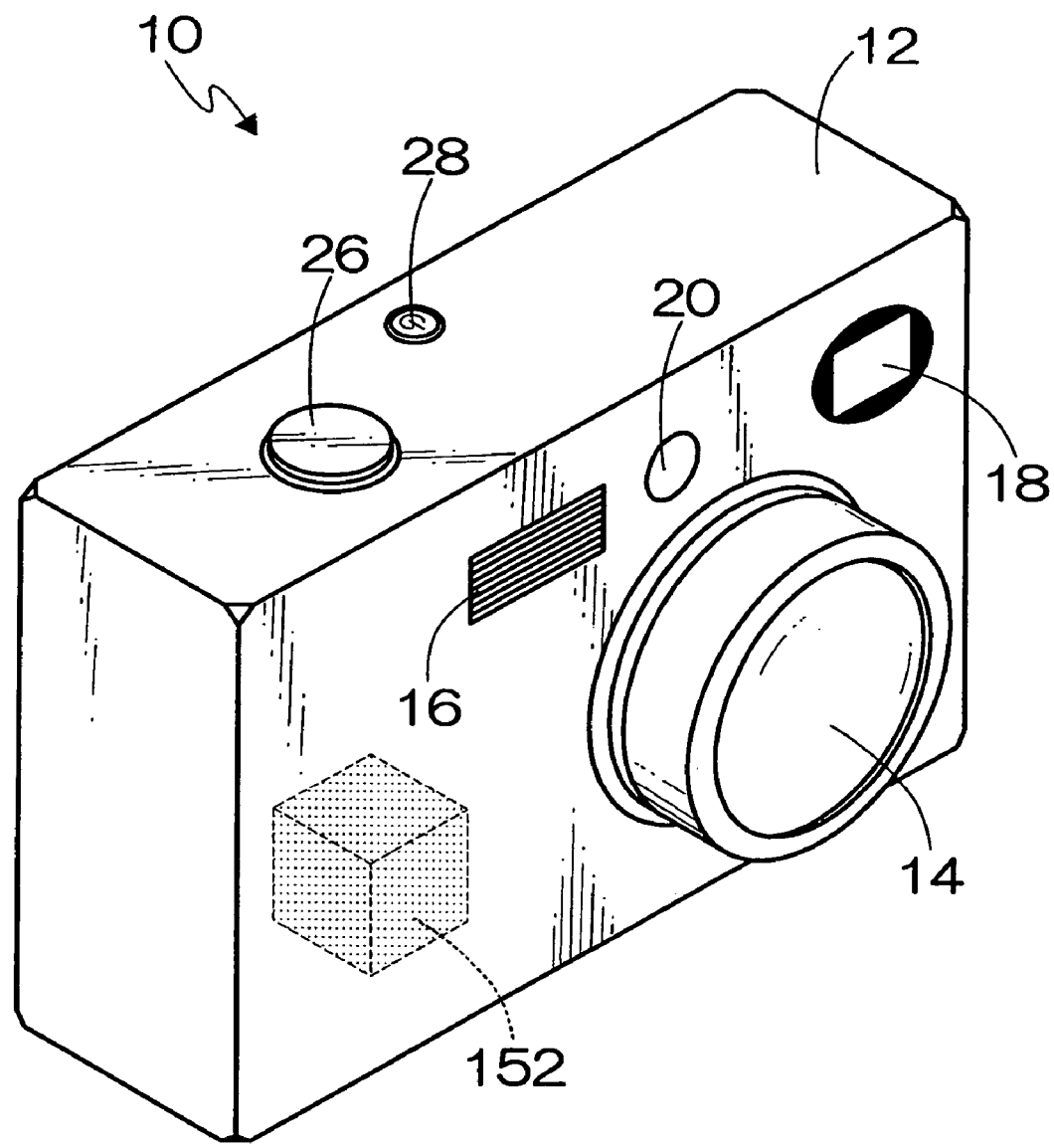
FIG. 1 is a perspective view of the front face of a digital camera to which the present invention is applied.
Figure 2:
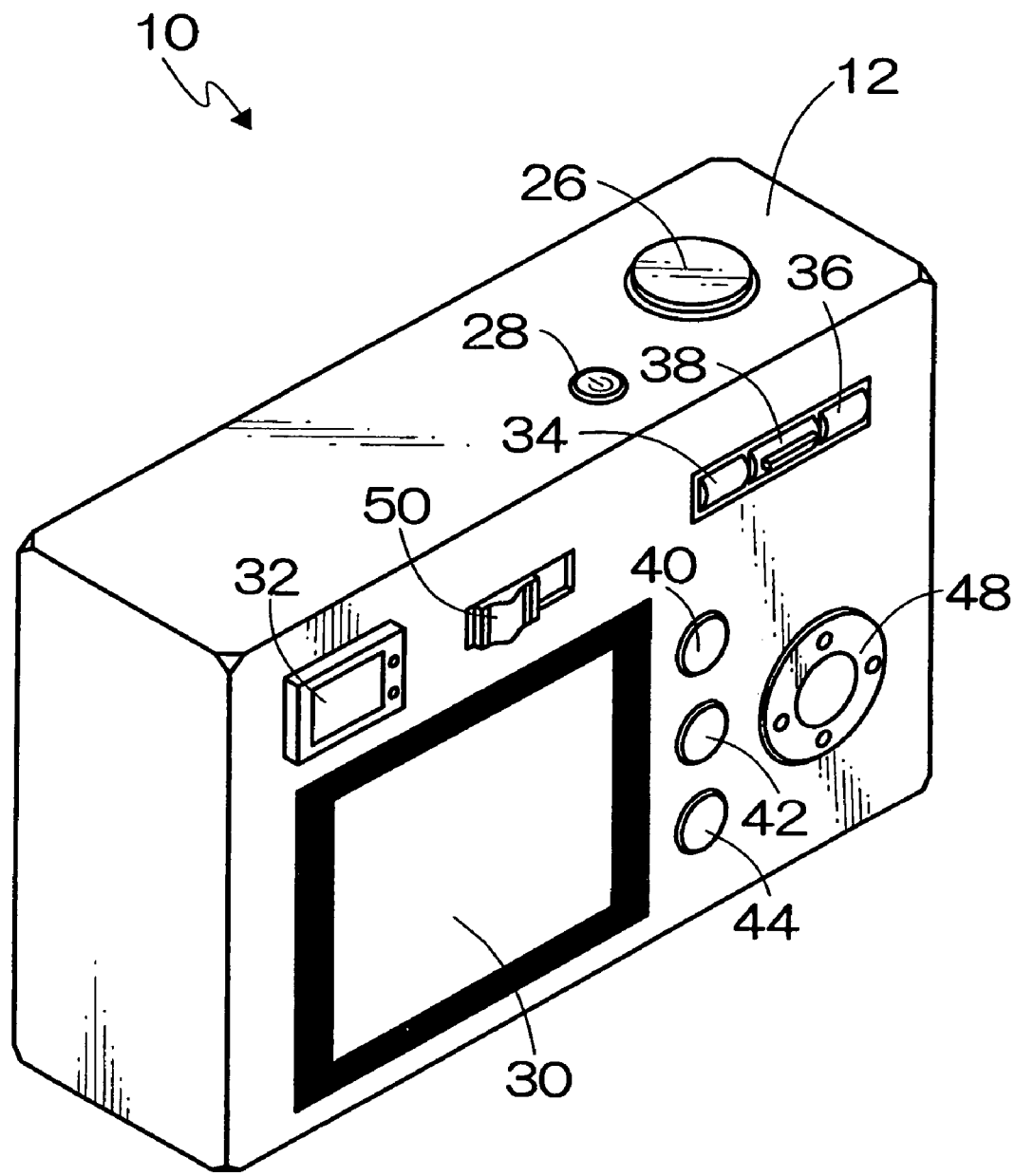
FIG. 2 is a perspective view of the rear face of the digital camera to which the invention is applied.

FIG. 1 and FIG. 2 show perspective views of the front and rear faces, respectively, of a digital camera 10 to which the present invention is applied.

As shown in FIG. 1, on the front face of a camera body 12, there are disposed a lens 14, an electronic flash 16, a view finder 18, a self-timer lamp 20 and so forth, and a shutter release button 26, a power switch button 28 and so forth are disposed on the top face.

On the rear face of the camera body 12, there are disposed a monitor 30, a view finder eyepiece 32, a strobe button 34, a macro button 36, a zooming lever 38, a display button 40, a BACK button 42, a menu/OK button 44, a cross button 48, a mode selector switch 50 and so forth as shown in FIG. 2.

The shutter release button 26 is configured of a two-step stroke switch which permits half pressing and full pressing. Half pressing of this shutter release button 26 actuates the AE/AF (Auto Exposure/Auto Focus) function of the camera, and a picture is taken when the button is full pressed.

The monitor 30 comprises a liquid crystal display capable of color displaying. The monitor 30 is used as the display screen for both recorded pictures and user interfacing. The monitor 30 also serves as an electronic view finder when a picture is taken. The display button 40 functions as a button to instruct changing of the displayed content on the monitor 30.

The electronic flash button 34 functions as a button to change over the electronic flash mode. Each time the electronic flash button 34 is pressed, the electronic flash mode in use when a picture is taken is changed over from "Auto Electronic Flash" to "Anti-Red Eye Electronic Flash", "Forced Electronic Flash Lighting", "Slow Synchronization" and "Prohibit Electronic Flash Lighting" in that sequence.

The macro button 36 functions as a button to instruct ON/OFF switching of the macro function. Each time the macro button 36 is pressed, the macro function to be used when a picture is taken is turned on or off.

The zooming lever 38 functions as a lever to instruct zooming (in or out) on the object whose picture is to be taken, and also functions as a lever to instruct enlarging or reducing the displayed image. The zooming lever 38 is swingable up and down. Turning it upward results in zooming in, while turning it downward results in zooming out.

The menu/OK button 44 functions as a button to instruct transition from a normal screen to a menu screen in each mode (menu button), and also functions as a button to make definite the choice made on the screen and to instruct its execution (OK button). The BACK button 42 functions as a button to instruct cancellation of an input operation or the like.

The cross button 48 functions as a button to enter instructions in four directions, up and down, right and left, and is used for selecting any offered item on a menu screen or other similar purposes.

The mode selector switch 50 functions as a switch to instruct changing over from one mode to another, and is slidable between "Shooting Position" and "Playback Position". When the mode selector switch 50 is turned to its "Shooting Position", the digital camera 10 is set to the "Shooting Mode", or when it is turned to its "Playback Position", the camera is set to the "Playback Mode".

Figure 3:
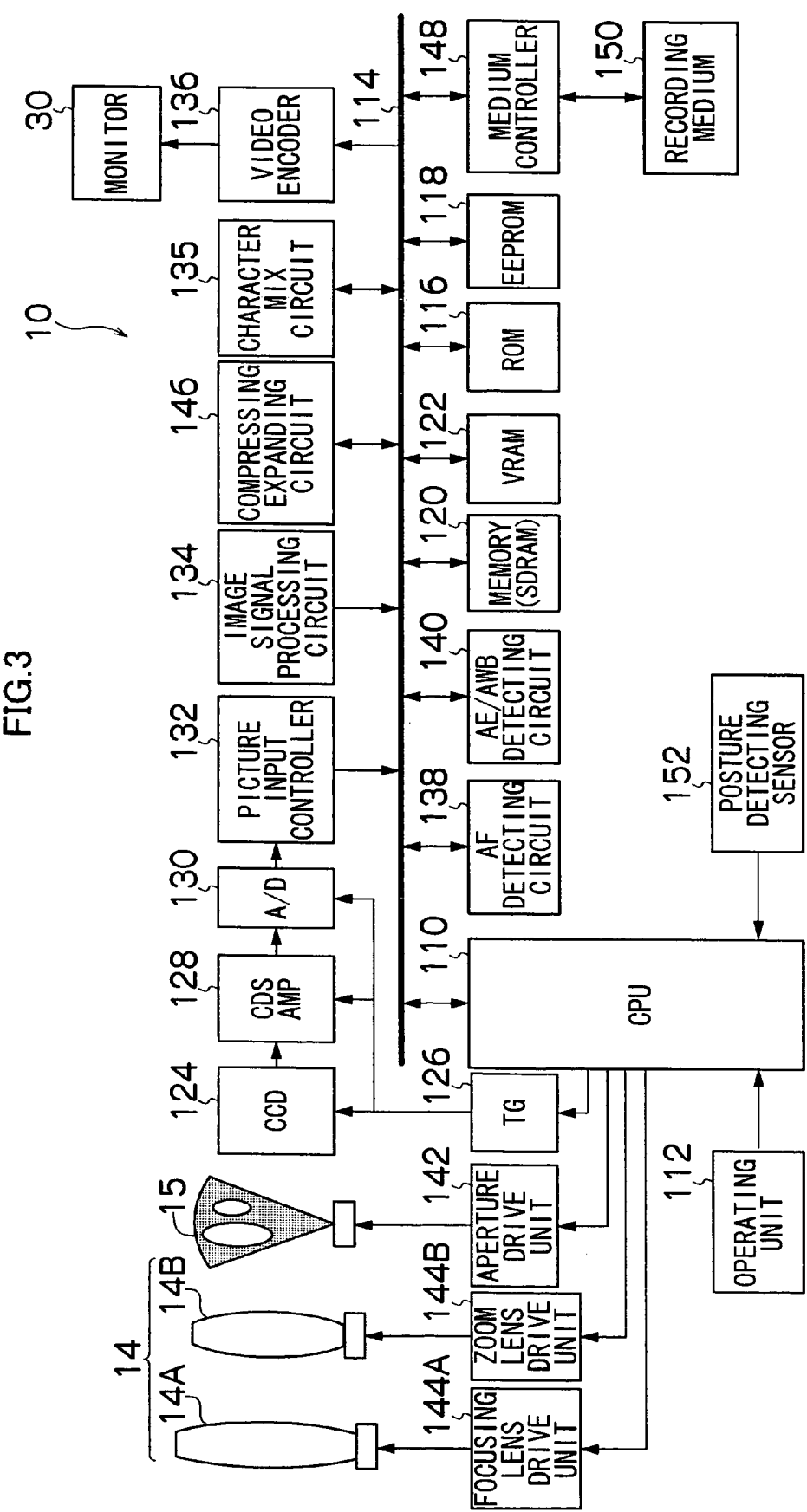
FIG. 3 is a block diagram showing the internal configuration of the digital camera to which the invention is applied.

FIG. 3 is a block diagram schematically illustrating the internal configuration of the digital camera 10 shown in FIG. 1 and FIG. 2.

The overall operation of the digital camera 10 is under the integrated control of a central processing unit (CPU) 110. The CPU 110 controls the camera system under prescribed programs on the basis of input information from an operating unit 112 (including the shutter release button 26, power switch button 28, strobe button 34, macro button 36, zooming lever 38, display button 40, BACK button 42, menu/OK button 44, cross button 48 and mode selector switch 50).

A ROM 116 connected to the CPU 110 via a bus 114 stores various data and the like necessary for programs and controls executed by the CPU 110, and an EEPROM 118 stores various items of setting information regarding the operation of the digital camera 10, including folder management information. A memory (SDRAM) 120 is used not only as the area for arithmetic operations by the CPU 110 but also as that for temporary storage of video data and audio data. A VRAM 122 is used as a temporary storage area dedicated to video data.

The digital camera 10 is enabled to take a picture when the mode selector switch 50 is set to the shooting mode, and power is then supplied to the photographic unit including a charge coupled device (CCD) 124.

Light having passed the lens 14 forms an image on the light receiving face of the CCD 124 via an iris diaphragm 15. Many photodiodes (light receiving elements) are two-dimensionally arranged on the light receiving face of the CCD 124, and primary color filters of red (R), green (G) and blue (B) matching the photodiodes are arranged in a prescribed structure (such as Bayer, G stripe or else). The CCD 124 has an electronic shutter function to control the duration of electric charge accumulation in the photodiodes (shutter speed), and the CPU 110 controls the duration of electric charge accumulation in the CCD 124 via a timing generator 126.

The image of the object formed on the light receiving face of the CCD 124 are converted by the photodiodes into signal charges matching the quantity of incident light. The signal charges accumulated in the photodiodes are successively read out in accordance with an instruction from the CPU 110 as voltage signals (image signals) matching the signal charges on the basis of drive pulses provided by the timing generator 126.

The image signals supplied by the CCD 124 are delivered to an analog processing unit (CDS/AMP) 128, where R, G and B signals for individual pixels, after being subjected to sampling hold (correlated double sampling), are amplified and fed to an A/D converter 130.

The A/D converter 130 converts R, G and B signals supplied from the analog processing unit 128 into digital R, G and B signals. The digital R, G and B signals supplied from the A/D converter 130 are stored into the memory 120 via a picture input controller 132.

A image signal processing circuit 134 processes R, G and B signals stored in the memory 120 in accordance with instructions from the CPU 110. Thus, the image signal processing circuit 134 functions as image processing device containing a synchronizing circuit (a processing circuit for interpolating spatial discrepancies of color signals ensuing from the color filter arrangement of one-charged CCD and converting the color signals into simultaneous signals), a white balance correction circuit, a gamma correction circuit, a contour correction circuit and a luminance/color differential signal generating circuit, and performs a prescribed signal processing in accordance with instructions from the CPU 110 while utilizing the memory 120. R, G and B signals entered into the image signal processing circuit 134 are converted into luminance signals (Y signals) and color differential signals (Cr and Cb signals) by the image signal processing circuit 134 and, after going through a prescribed processing including gamma correction, are stored into the VRAM 122.

When a taken picture is to be displayed on the monitor 30, the picture is delivered from the VRAM 122 to a video encoder 136 via a character MIX circuit 135. The video encoder 136 converts the entered video data into signals of a prescribed formula for the displaying purpose (e.g. color composite video signals of the NTSC system) and supplies the converted signals to the monitor 30. This results in displaying of the picture taken by the CCD 124 on the monitor 30.

By periodically taking in image signals from the CCD 124, replacing periodically video data in the VRAM 122 with video data generated from those image signals, and supplying those replacing video data to the monitor 30, a picture taken by the CCD 124 is displayed on a real time basis. The photographer can confirm the angle of view by looking at this picture displayed on the monitor 30 on a real time basis (through image).

The character MIX circuit 135 synthesizes the video data supplied from the VRAM 122 with prescribed characters and symbolic data supplied from the memory 120 in accordance with commands from the CPU 110, and supplies the synthesized information to the video encoder 136. This results in displaying of this information including characters and symbols superposed on the through image.

A picture is taken by pressing down the shutter release button 26. When the shutter release button 26 is half pressed first, an S1-on signal is entered into the CPU 110, and the CPU 110 starts an AE/AF processing.

First, the image signals taken in from the CCD 124 via the picture input controller 132 are entered into an AF detecting circuit 138 and an AE/AWB (Auto Exposure/Auto White Blanket) detecting circuit 140.

The AE/AWB detecting circuit 140, which includes a circuit which divides each frame into a plurality of areas (e.g. 16×16) and cumulatively adds the R, G and B signals in each divided area, provides the cumulative sums to the CPU 110. The CPU 110 detects the brightness of the object (object luminance) on the basis of the cumulative sums obtained from the AE/AWB detecting circuit 140, and computes the exposure value (photographic EV) suitable for the shooting. Then the CPU 110 determines the aperture stop and the shutter speed from the figured-out photographic EV and prescribed program lines, and accordingly controls the electronic shutter release and the aperture drive unit 142 of the CCD 124 to achieve an appropriate quantity of exposure.

When the white balance is automatically adjusted, the AE/AWB detecting circuit 140 computes the average cumulative sums of the R, G and B signals separately for each color and each divided area, and provides the computed results to the CPU 110. The CPU 110 figures out the R/G and B/G ratios in each divided area from the acquired cumulative sums of R, B and G, and determines the type of light source on the basis of the distribution of the figured-out R/G and B/G values in the color spaces of R/G and B/G among other factors. Then according to the white balance adjustment value suitable for the determined type of light source, the gains of the white balance adjusting circuit for the R, G and B signals (white balance correction values) are controlled, for instance to make the value of each ratio approximately 1 (i.e. the cumulative RGB ratio per frame R:G:B≦1:1:1), and to correct signals on the each color channel.

The AF detecting circuit 138 is configured of a high pass filter which passes only the high frequency component of G signals, an absolutizing unit, an AF area extracting unit for cutting out signals in a prescribed focused area (e.g. the central area of the frame), and an accumulating unit for cumulatively adding absolute value data in the AF area, and the data of cumulative sums figured out by the AF detecting circuit 138 is notified to the CPU 110. The CPU 110, while controlling a focusing lens drive unit 144A to shift a focusing lens 14A, computes focus evaluation values (AF evaluation values) at a plurality of AF detection points, and determines the lens position where the evaluation value is the maximum as the in-focus position. Then the CPU 110 so controls the focusing lens drive unit 144A as to shift the focusing lens 14A to the in-focus position so determined.

Thus, in response to the half pressing of the shutter release button 26, an AE/AF processing is performed.

The photographer manipulates as required the zooming lever 38 to zoom the lens 14 to adjust the angle of view. When the zooming lever 38 is turned upward (in the telescopic direction), a zoom-in signal is entered into the CPU 110, and the CPU 110 in response to this signal drives a zoom lens drive unit 144B to shift a zoom lens 14B in the telescopic direction. When the zooming lever 38 is turned downward (in the wide angle direction), a zoom-out signal is entered into the CPU 110, and the CPU 110 in response to this signal drives the zoom lens drive unit 144B to shift the zoom lens 14B in the wide angle direction.

After that, when the shutter release button 26 is fully pressed, an S2-on signal is entered into the CPU 110, and the CPU 110 starts a picture taking and record processing. Thus, video data acquired in response to the S2-on signal are converted into luminance/color differential signals (Y/C signals) by the image signal processing circuit 134, and the converted signals, after going through a prescribed processing including gamma correction, are stored into the memory 120.

The video data stored into the memory 120, after being compressed into a prescribed format (e.g. the JPEG format) by a compressing/expanding circuit 146, are recorded onto a recording medium 150 via a medium controller 148.

If the playback mode is selected with the mode selector switch 50, video data (the video data last recorded on the recording medium 150) are read out of the recording medium 150. The read-out video data, after being expanded into non-compressed YC signals by the compressing/expanding circuit 146, are supplied to the monitor 30 via the image signal processing circuit 134, the character MIX circuit 135 and the video encoder 136. In this way, a picture recorded in the recording medium 150 is reproduced and displayed on the monitor 30.

Frame-by-frame reproduction of a picture is accomplished by manipulating the cross button 48. If the right side key of the cross button 48 is pressed, the next set of video data will be read out of the recording medium 150, reproduced and displayed on the monitor 30. Or if the left side key of the cross button 48 is pressed, the preceding set of video data will be read out of the recording medium 150, reproduced and displayed on the monitor 30.

The digital camera 10, embodying the present invention as described above, can photograph and reproduce still images, and one of its photographic functions enables a picture in a composition intended by its owner to be taken by another person. This function is intended to have the posture of the camera to take a picture in a composition intended by the owner stored in advance by the camera and thereby enable another person requested to take a picture on behalf of the owner to keep the camera in the same posture as the stored posture. This function of requested picture taking will be described below.

Figure 4:
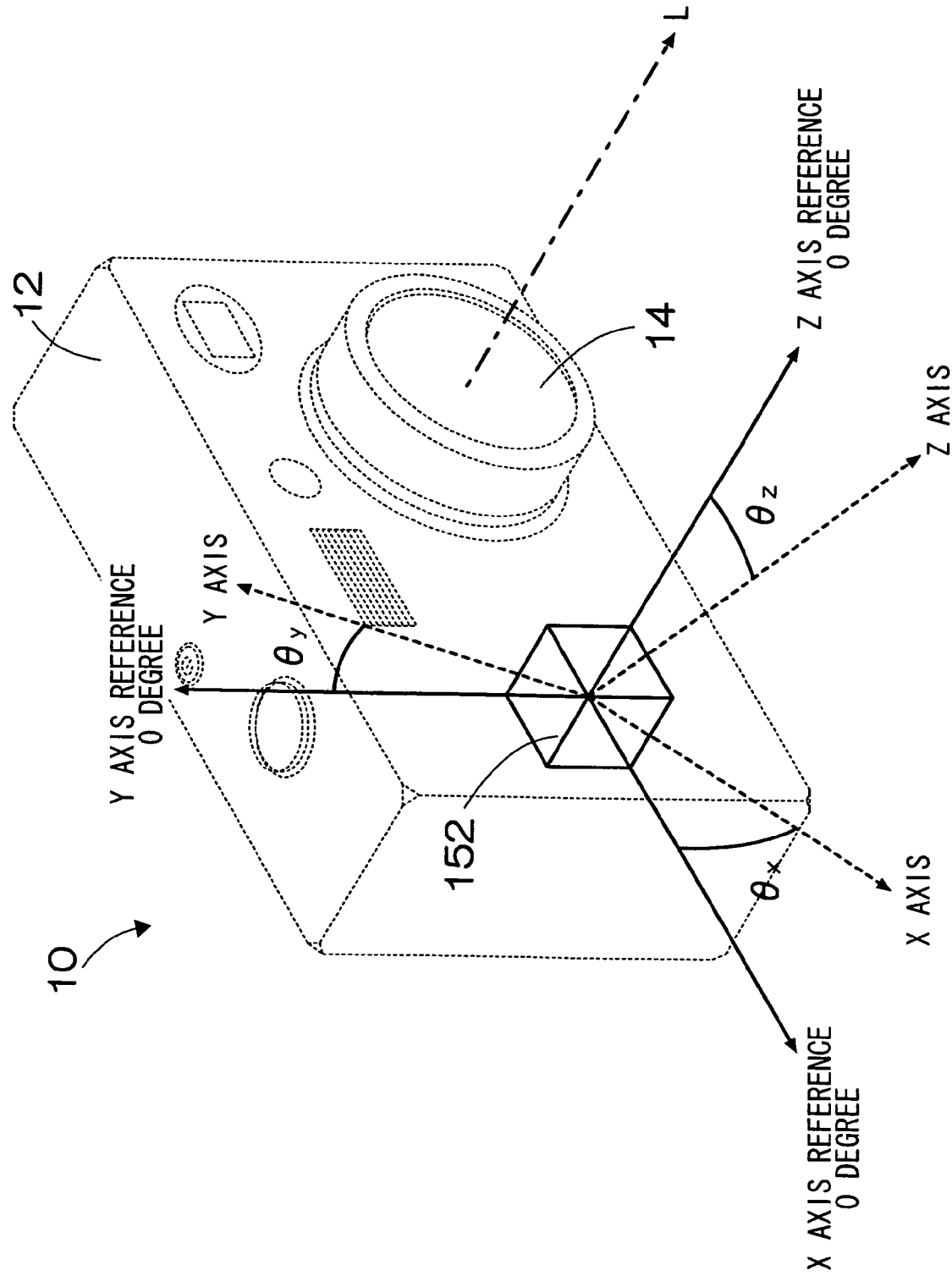
FIG. 4 shows the configuration of a posture detecting sensor.

As shown in FIG. 4, a posture detecting sensor 152 for detecting the posture of the camera body 12 is installed inside the camera body 12.

The posture detecting sensor 152 detects the inclination angles $\theta_x$, $\theta_y$ and $\theta_z$ of the X, Y and Z axes, respectively, of the camera body 12, the X axis being parallel to the horizontal axis, the Y axis being parallel to the vertical axis, both of the camera body 12, and the Z axis being parallel to the optical axis L of the lens 14.

Figure 5:
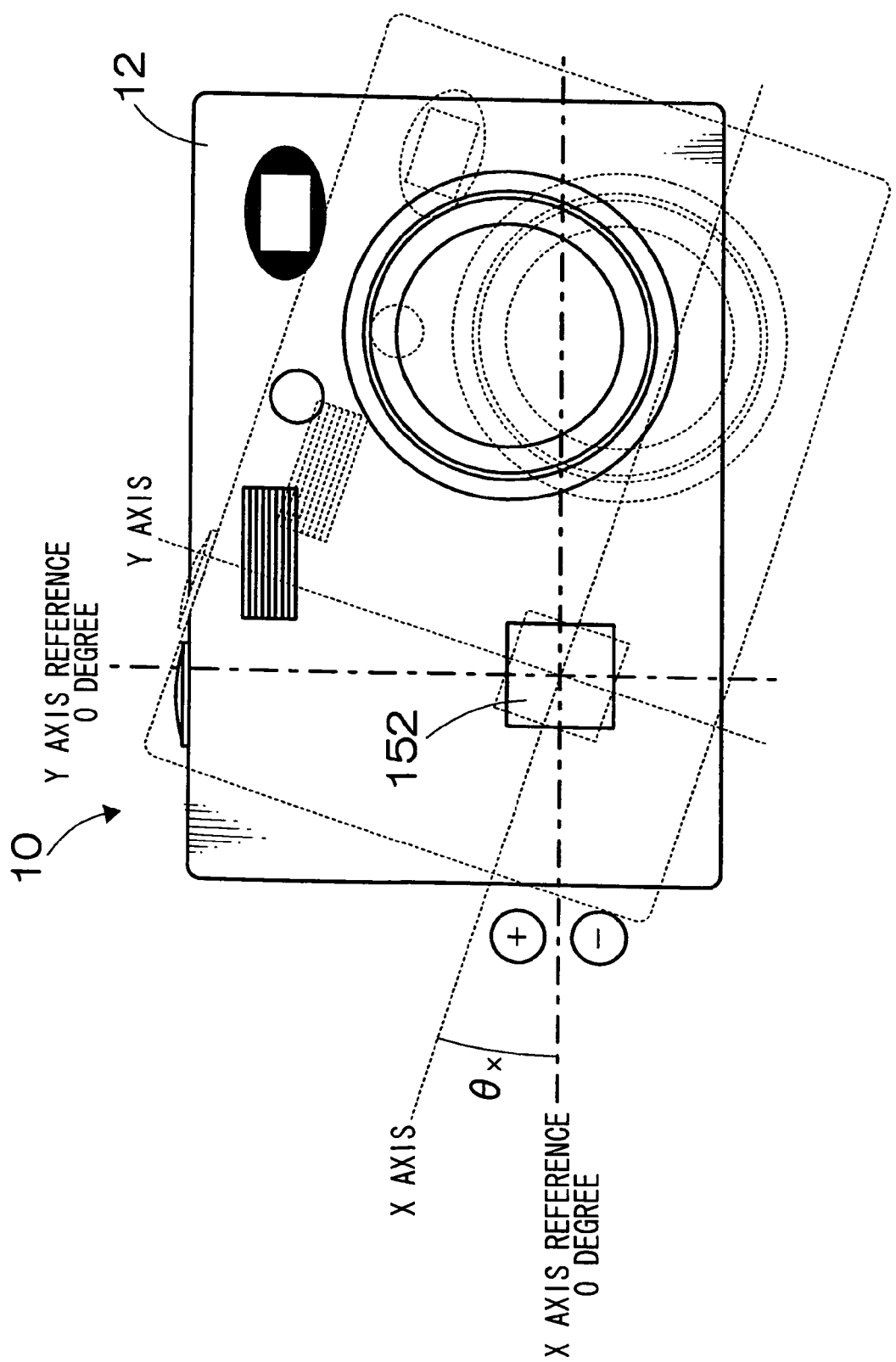
FIG. 5 illustrates the detecting angle of the posture detecting sensor.

The inclination angle $\theta_x$ here is detected, as shown in FIG. 5, where the X axis is held horizontal, by an acceleration sensor (X) with reference to the 0 degree angle of inclination from that horizontal state (i.e. the angle of rotation of the X axis around the Z axis).

Figure 6:
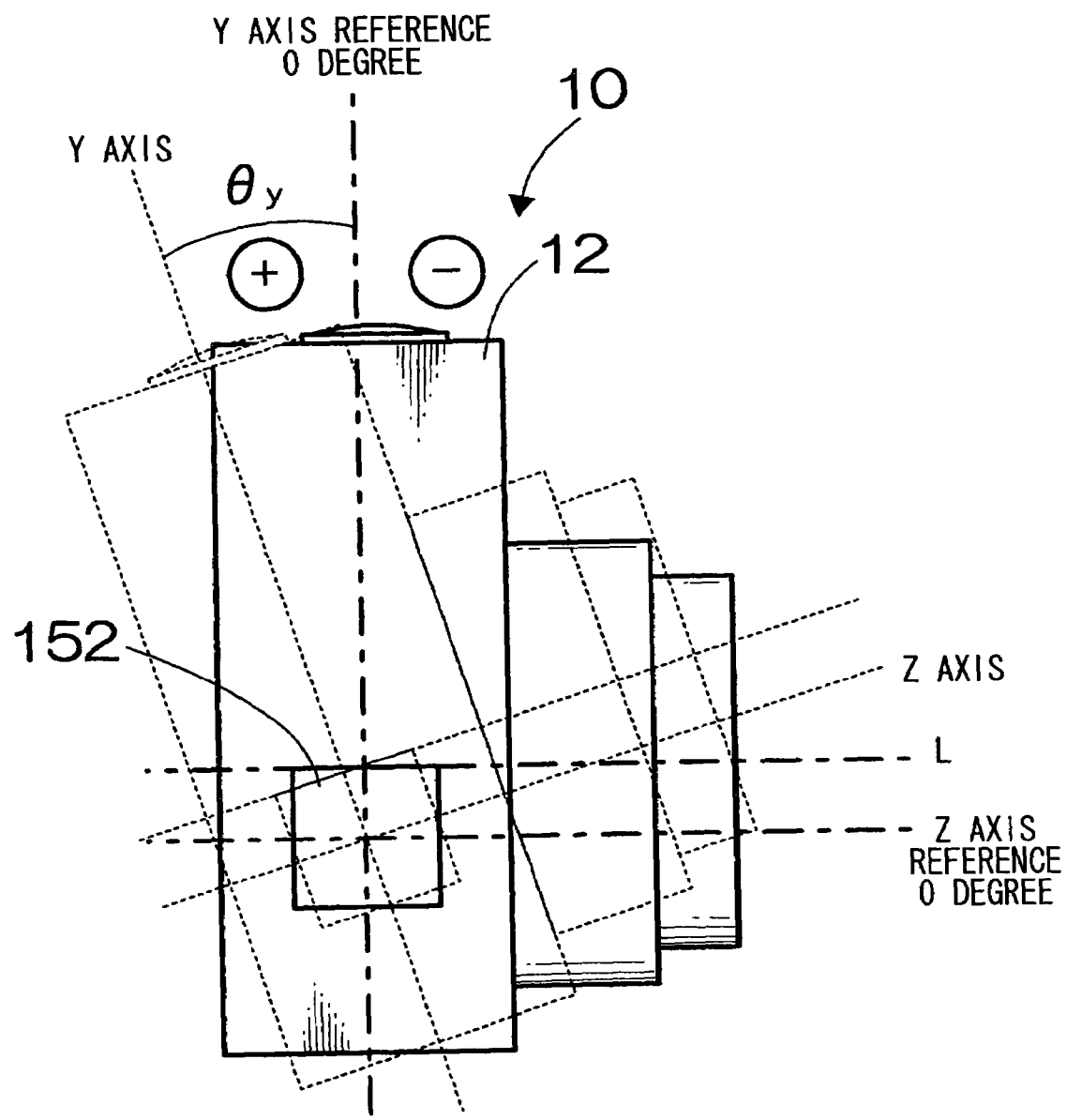
FIG. 6 illustrates the detecting angle of the posture detecting sensor in another way.

The inclination angle $\theta_y$ is detected, as shown in FIG. 6, where the Y axis is held vertical, by an acceleration sensor (Y) with reference to the 0 degree angle of inclination from that vertical state (i.e. the angle of rotation of the Y axis around the X axis).

The inclination angle $\theta_x$ is detected, as shown in FIG. 7, where the Z axis is held southward, by a magnetic sensor with reference to the 0 degree angle of inclination from the southward direction, (i.e. the angle of rotation of the Z axis around the Y axis).

The posture data ($\theta_x$, $\theta_y$ and $\theta_z$) detected by the posture detecting sensor 152 are entered into the CPU 110.

Figure 8A:
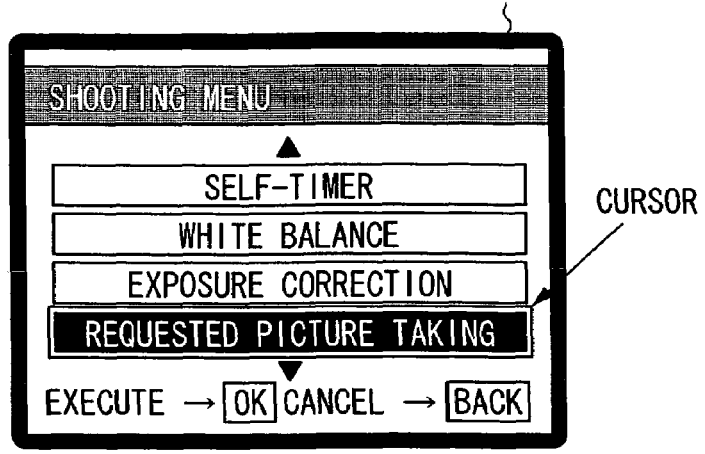
FIGS. 8A to 8C show examples of shooting menu displayed.

The function of requested picture taking is called from a shooting menu, and set. Thus, when the menu/OK button 44 is pressed in the shooting mode, the screen of the shooting menu is displayed on the monitor 30 as shown in FIG. 8A, and "Requested Picture Taking" is selected out of the options in this shooting menu. The selection of any option in the menu is accomplished by moving the cursor to that option with the cross button 48, and the selected option is displayed in reversal. When the cursor is moved to the desired option in the menu and the menu/OK button 44 is pressed, the selection is finalized.

Figure 9:
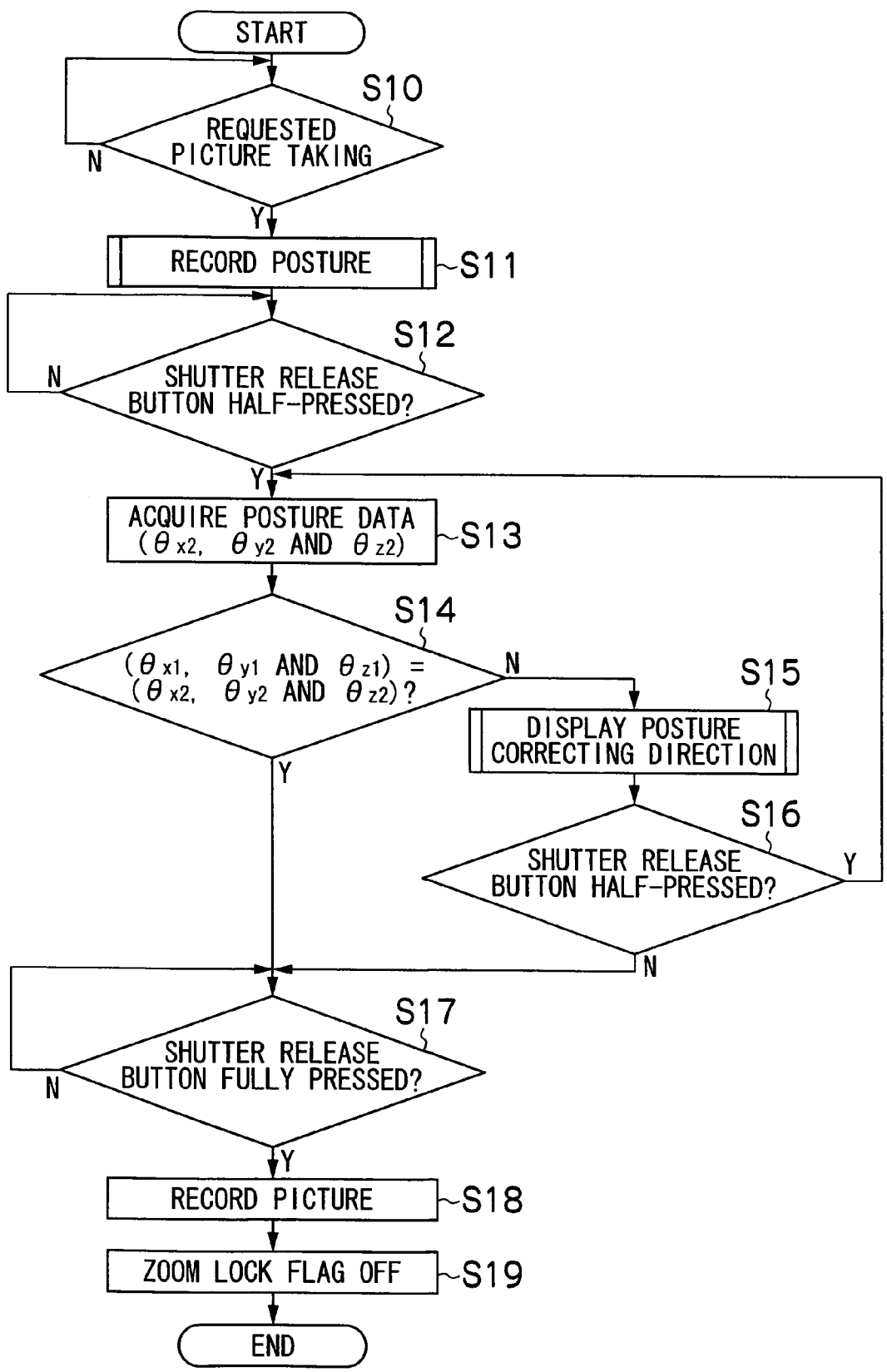
FIG. 9 is a flow chart of the procedure of image pickup processing in a requested shooting mode.

By selecting "Requested Picture Taking" from the shooting menu in this way, the digital camera 10 is set to the requested picture taking mode. The CPU 110 judges whether or not the camera has been set in the requested picture taking mode and, if it judges that the camera has been set to the requested picture taking mode, will begin the processing of requested picture taking in accordance with the flow chart shown in FIG. 9.

Figure 10:
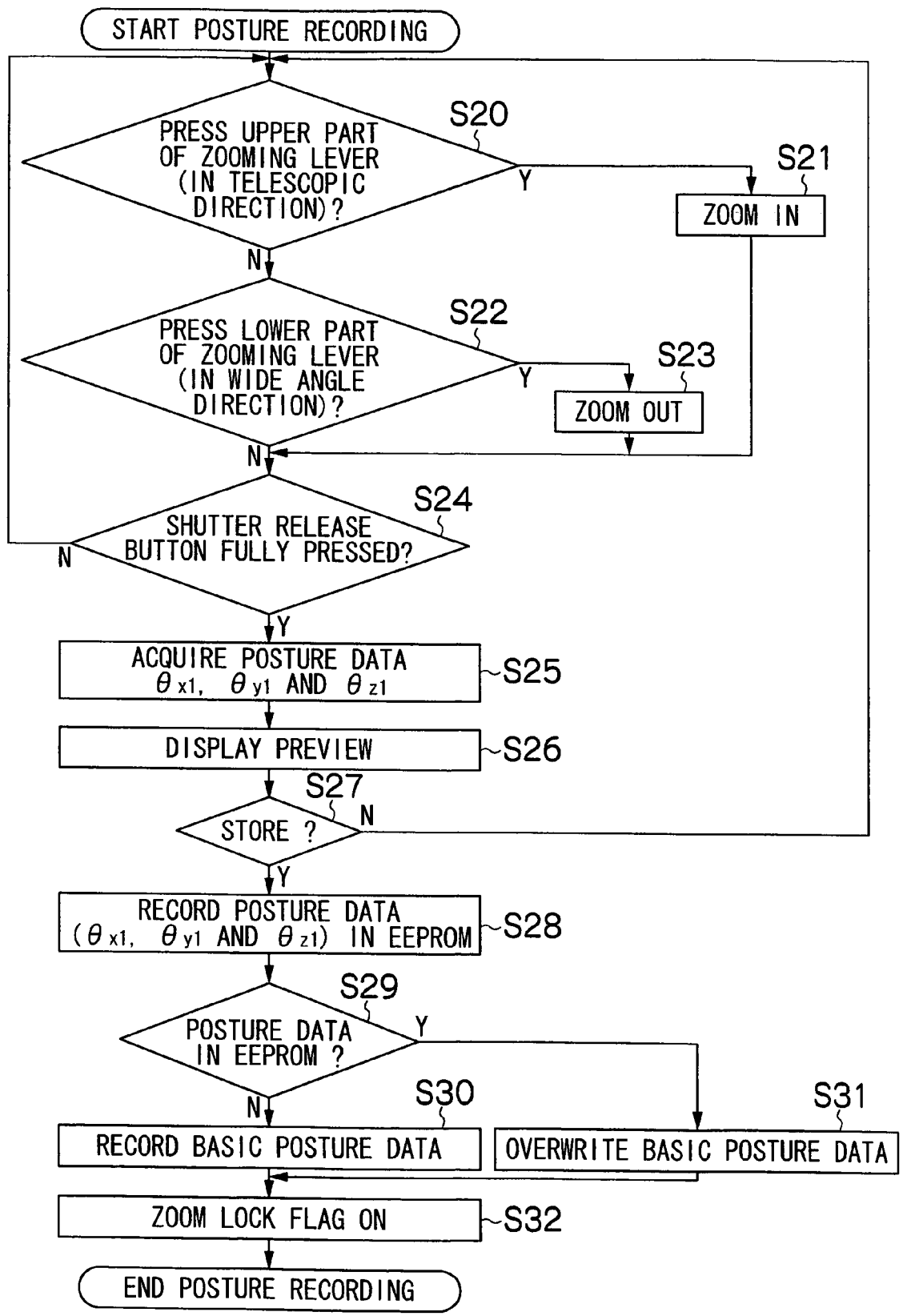
FIG. 10 is a flow chart of the procedure of posture record processing.

When the camera is set to the requested picture taking mode, first the storing of the posture is processed (step S11). Thus, the composition in which the picture is to be taken by somebody else is judged, and the camera is caused to store the posture it will have to take for that composition. This processing of posture storing is accomplished in the procedure charted in FIG. 10.

Figure 8B:
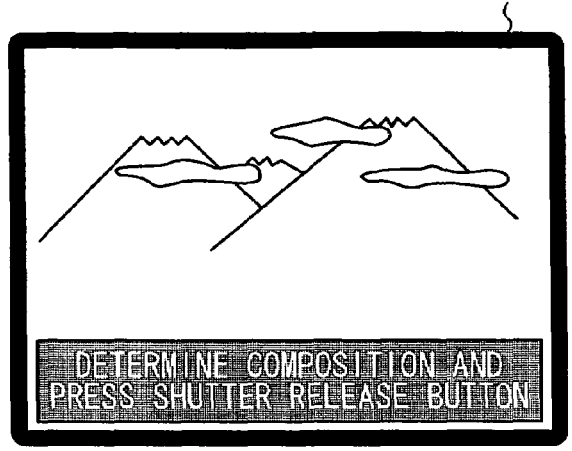

When the option of "Requested Picture Taking" is selected from the shooting menu shown in FIG. 8A, the screen of the monitor 30 is changed over to the through image as shown in FIG. 8B. At the same time, a message urging picture taking for posture storing ("Determine Composition and Press Shutter Release Button") is displayed, superposed over the through image. The user (the person who requests the picture taking), in response to this message, determines the composition in which he desires to have the picture taken. Thus, he operates the zoom, and determines the angle of view at which he desires for the shot.

Hereupon, the CPU 110 judges whether or not the zooming lever 38 has been manipulated upward (in the telescopic direction) (step S20) and, if it judges in the affirmative, will issue a command to the zoom lens drive unit 144B to zoom in the zoom lens 14B (step S21). Or if the CPU 110 finds that the zooming lever 38 has not been manipulated upward (in the telescopic direction), it will judge whether or not the zooming lever 38 has been manipulated downward (in the wide angle direction) (step S22) and, if it judges in the affirmative, will issue a command to the zoom lens drive unit 144B to zoom out the zoom lens 14B (step S23).

In this way, the user manipulates the zoom, determines the angle of view at which he desires to take the picture and, when he has determined it, fully presses the shutter release button 26. The CPU 110 judges whether or not the shutter release button 26 has been fully pressed (step S24). If the CPU 110 judges in the affirmative, the CPU 110 will acquire video data from the CCD 124 and at the same time acquire posture data ($\theta_{x1}$, $\theta_{y1}$ and $\theta_{z1}$) from the posture detecting sensor 152 (step S25).

Figure 8C:
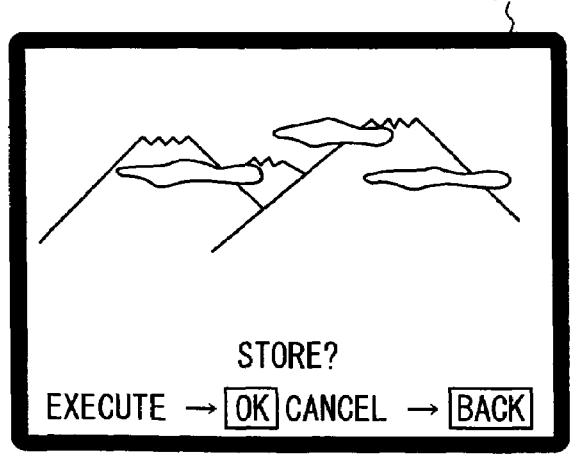

Then, as shown in FIG. 8C, the CPU 110 causes the acquired video data to be preview-displayed on the monitor 30 and a message to ask whether or not to store the data ("Store?") (step S26). The user judges on the basis of this display on the monitor 30 whether or not it is required to store the data and, if it is, will press the menu/OK button 44 or, if data are to be acquired anew, press the BACK button 42.

The CPU 110, on the basis of an input from the operating unit 112, judges whether or not the data require to be stored (step S27) and, if the BACK button 42 is pressed and the need for storing is denied, will return to step S20 to redo the processing from the determination of the angle of view onward.

Or if the menu/OK button 44 is pressed and the need for storing is affirmed, the CPU 110 will record into the EEPROM 118 the acquired posture data ($\theta_{x1}$, $\theta_{y1}$ and $\theta_{z1}$) as the basic posture data ($\theta_{x1}$, $\theta_{y1}$ and $\theta_{z1}$) (step S28).

Hereupon, the CPU 110 judges whether or not there are previously acquired basic posture data ($\theta_{x1}$, $\theta_{y1}$ and $\theta_{z1}$) in the storage area of the EEPROM 118 (step S29). If the CPU 110 judges there are not, the CPU 110 will write as they are the basic posture data ($\theta_{x1}$, $\theta_{y1}$ and $\theta_{z1}$) acquired from the posture detecting sensor 152 (step S30). Or if previously acquired basic posture data ($\theta_{x1}$, $\theta_{y1}$ and $\theta_{z1}$) are remaining, the basic posture data ($\theta_{x1}$, $\theta_{y1}$ and $\theta_{z1}$) acquired from the posture detecting sensor 152 will be written over them (step S31).

After that, in order to prevent the angle of view from being varied by an inadvertent manipulation of the zoom, the CPU 110 turns on a zoom lock flag to make zooming impossible (step S32).

The processing of posture recording is completed by going through these steps. After that, the user (the person who requests the picture taking) hands over the digital camera 10 to the person who is to do the actual shooting, and asks the latter to take the picture.

The user moves around to settle the intended picture within the composition of his own choice, and the person requested to take the picture shoots in the position where the user (the person who has requested the picture taking) shot for posture recording.

The person requested to take the picture half-presses the shutter release button 26 to focus on the object. The CPU 110 judges whether or not the shutter release button 26 is half-pressed (step S12); if it judges in the affirmative, performs AE/AF processing, and acquires posture data ($\theta_{x2}$, $\theta_{y2}$ and $\theta_{z2}$) from the posture detecting sensor 152 (step S13).

Then, the CPU 110 compares the acquired posture data ($\theta_{x2}$, $\theta_{y2}$ and $\theta_{z2}$) with the basic posture data ($\theta_{x1}$, $\theta_{y1}$ and $\theta_{z1}$) stored in the EEPROM 118, and judges whether or not they are identical (step S14). If the CPU 110 judges they are not, the CPU 110 will perform a display processing of the correcting direction according to the extent of discrepancy (step S15).

This display processing of the correcting direction is performed in the following procedure shown in the flow chart of FIG. 11.

First, the CPU 110 judges whether or not the inclination (the measured inclination angle $\theta_{x2}$) of the horizontal axis (the X axis) is within a range of ±5 degrees from the inclination of the basic posture (the basic inclination angle $\theta_{x1}$). Thus, the CPU 110 judges whether or not the measured inclination angle $\theta_{x2}$ satisfies an inequality ($\theta_{x1}-5$)$\theta_{x2}$<($\theta_{x1}+5$) (step S40).

If the CPU 110 judges that the measured inclination angle $\theta_{x2}$ does not satisfy the inequality ($\theta_{x1}-5$)<$\theta_{x2}$<($\theta_{x1}+5$), then it will judge whether or not the X axis is inclined by not less than +5 degrees from the basic posture (the inclination angle $\theta_{x1}$). Thus, the CPU 110 judges whether or not the measured inclination angle $\theta_{x2}$ satisfies an inequality ($\theta_{x1}+5$)$\leq\theta_{x2}$ (step S41).

Figure 12C:
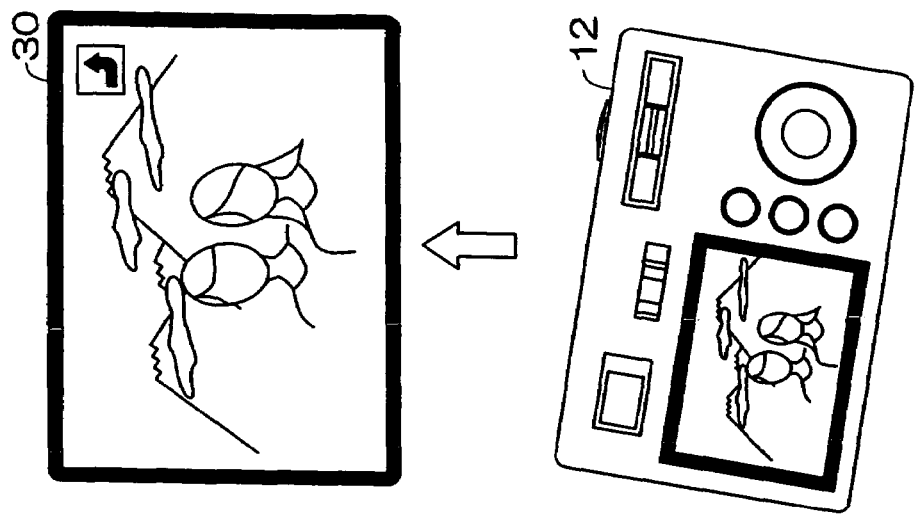
FIGS. 12A to 12C show examples of icons of the correcting direction displayed.
Figure 12B:
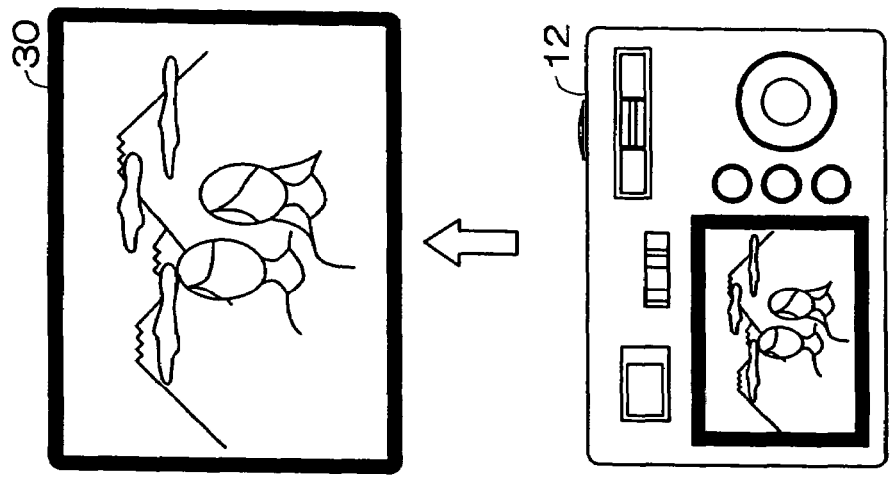
Figure 12A:
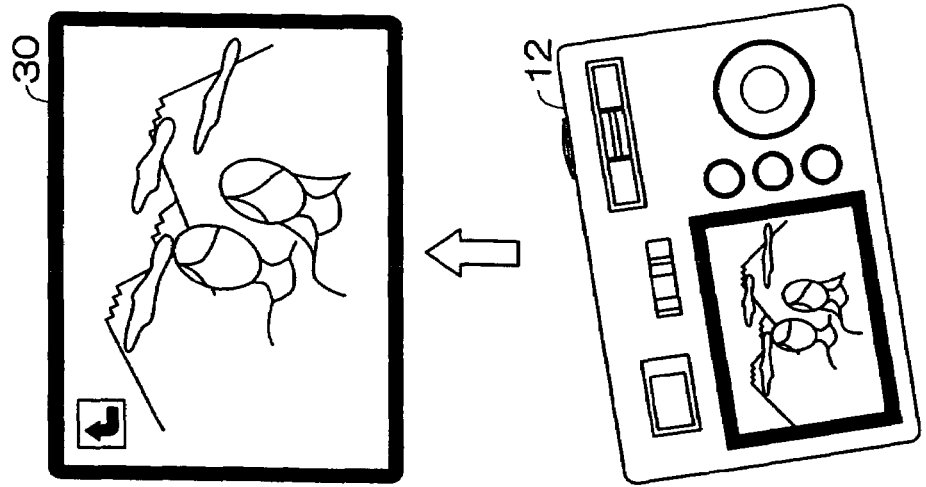

Then the CPU 110, if it judges that the X axis is inclined by not less than +5 degrees from the basic posture (the inclination angle $\theta_{x1}$), will cause, with a view to correcting the deviation, an icon for correcting the inclination of the horizontal axis of the camera body 12 in the minus direction to be displayed on the monitor 30 (step S42). For instance, as shown in FIG. 12A, it displays the icon bearing an L-shaped arrow in the upper left corner of the monitor 30.

Or if the inclination of the X axis is not inclined more than −5 degrees from the basic posture (the inclination angle $\theta_{x1}$), the CPU 110 will cause an icon for correcting the inclination of the horizontal axis of the camera body 12 in the plus direction to be displayed on the monitor (step S43). For instance, as shown in FIG. 12C, it displays the icon bearing an L-shaped arrow in the upper right corner of the monitor 30.

If the measured inclination angle $\theta_{x2}$ satisfies the inequality ($\theta_{x1}-5$)<$\theta_{x2}$<($\theta_{x1}+5$), the CPU 110 will not cause the icon for correcting the inclination of the horizontal axis (the X axis) of the camera body 12 to be shown (step S44), but will shift to the process of judging the inclination of the vertical axis (the Y axis) of the camera body 12.

Thus, first the CPU 110 judges whether or not the inclination (the measured inclination angle $\theta_{y2}$) of the vertical axis (the Y axis) is within a range of ±5 degrees from the inclination of the basic posture (the basic inclination angle $\theta_{y1}$) (judges whether or not the measured inclination angle $\theta_{y2}$ satisfies an inequality ($\theta_{y1}-5$)<$\theta_{y2}$<($\theta_{y1}+5$) (step S45).

The CPU 110, if it judges that the measured inclination angle $\theta_{y2}$ does not satisfy the inequality ($\theta_{y1}-5$)<$\theta_{y2}$<($\theta_{y1}+5$), will then judge whether or not the Y axis is inclined from the basic posture (the inclination angle $\theta_{y1}$) by not less than +5. Thus, the CPU 110 judges whether or not the measured inclination angle $\theta_{y2}$ satisfies the inequality ($\theta_{y1}+5$)$\leq\theta_{y2}$ (step S46).

Figure 13A:
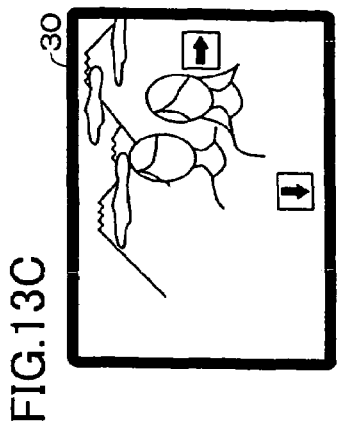
FIGS. 13A to 13I show another examples of icons of the correcting direction displayed.
Figure 13D:
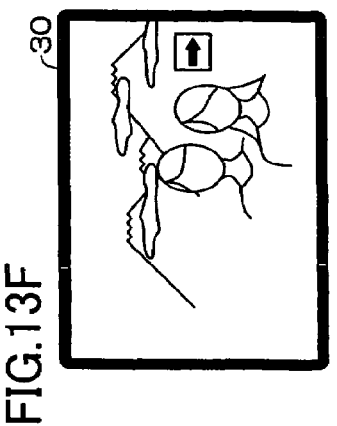
Figure 13G:
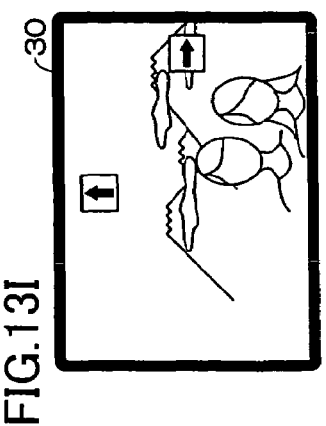
Figure 13B:
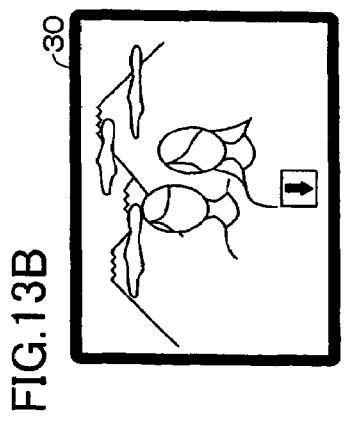
Figure 13E:
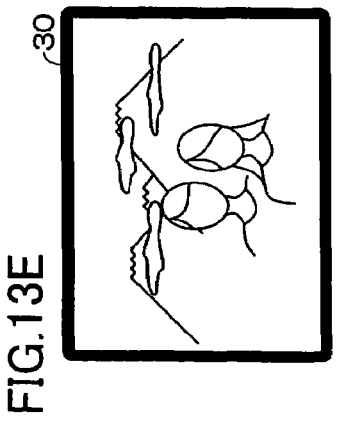

Then the CPU 110, if it judges that the Y axis is inclined by not less than +5 degrees from the basic posture (the inclination angle $\theta_{y1}$), will cause, with a view to correcting the deviation, an icon for correcting the inclination of the vertical axis of the camera body 12 in the minus direction to be displayed on the monitor (step S47). For instance, as shown in FIG. 13B, it displays the icon bearing a downward arrow in the bottom center of the monitor 30.

Figure 13H:
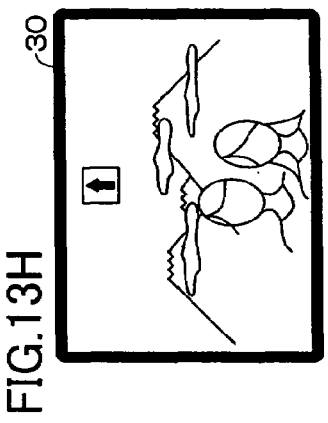
Figure 13C:
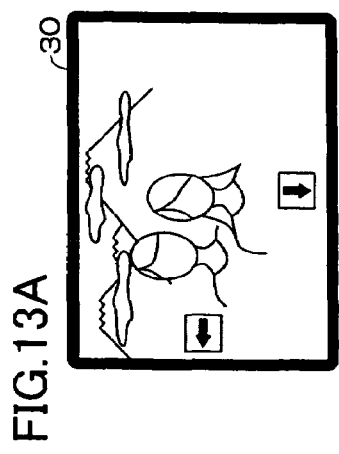

Or if the inclination of the Y axis is not inclined more than −5 degrees from the basic posture (the inclination angle $\theta_{y1}$), the CPU 110 will cause an icon for correcting the inclination of the vertical axis of the camera body 12 in the plus direction to be displayed on the monitor (step S48). For instance, as shown in FIG. 13H, it displays the icon bearing an upward arrow in the top center of the monitor 30.

If the measured inclination angle $\theta_{y2}$ satisfies the inequality ($\theta_{y1}-5$)<$\theta_{y2}$<($\theta_{y1}+5$), the CPU 110 will not have the icon for correcting the inclination of the vertical axis (the Y axis) the camera body 12 to be displayed (step S49), but will shift to the process of judging the inclination of the Z axis of the camera body 12.

Thus, the CPU 110 judges whether or not the inclination (the measured inclination angle $\theta_{z2}$) of the Z axis of the camera body 12 is within a range of ±5 degrees from the inclination of the basic posture (the basic inclination angle $\theta_{z1}$) (whether or not the measured inclination angle $\theta_{z2}$ satisfies an inequality ($\theta_{z1}-5$)<$\theta_{z2}$<($\theta_{z1}+5$)) (step S50).

The CPU 110, if it judges that the measured inclination angle $\theta_{z2}$ does not satisfy the inequality ($\theta_{z1}-5$)<$\theta_{z2}$<($\theta_{z1}+5$), will then judge whether or not the Z axis is inclined from the basic posture (the inclination angle $\theta_{z1}$) by not less than +5 degrees. Thus the CPU 110 judges whether or not the measured inclination angle $\theta_{z2}$ satisfies the inequality ($\theta_{z1}+5$)$\leq\theta_{z2}$ (step S51).

Figure 13F:
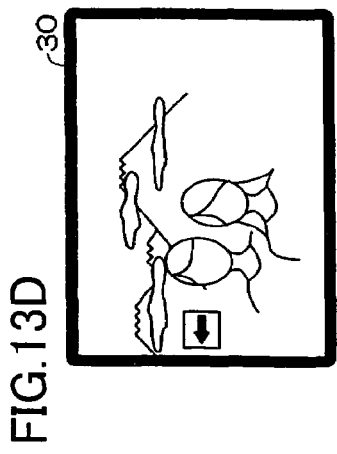
Figure 13I:
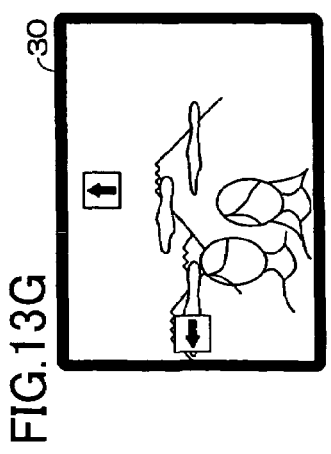

Then the CPU 110, if it judges that the Z axis is inclined by not less than +5 degrees from the basic posture (the inclination angle $\theta_{z1}$), will cause, with a view to correcting the deviation, an icon for correcting the inclination of the optical axis in the minus direction to be displayed on the monitor 30 (step S52). For instance, as shown in FIG. 13F, it displays the icon bearing a rightward arrow in the right center of the monitor 30.

Or if the inclination of the Z axis is inclined by not more than −5 degrees from the basic posture (the inclination angle $\theta_{z1}$), the CPU 110 will cause an icon for correcting the inclination of the optical axis in the plus direction to be displayed on the monitor (step S53). For instance, as shown in FIG. 13D, it displays the icon bearing a leftward arrow in the left center of the monitor 30.

If the measured inclination angle $\theta_{z2}$ satisfies the inequality ($\theta_{z1}-5$)<$\theta_{z2}$<($\theta_{z1}+5$), the CPU 110 will not have the icon for correcting the inclination of the Z axis of the camera body 12 to be displayed (step S54), and end a display processing of the correcting direction.

The user (the person requested to take the picture) corrects the posture of the camera body 12 according to this icon information displayed on the monitor 30.

After that, the CPU 110 again judges whether or not the shutter release button 26 is half-pressed (step S16) and, if it judges that the shutter release button 26 is half-pressed, will return to step 13 to acquire posture data again from the posture detecting sensor 152. On the basis of the acquired posture data, the CPU 110 determines the correcting direction, and have the necessary icon for the determined correcting direction displayed.

In this way, the icon of the correcting direction is updated every time the shutter release button 26 is half-pressed. The photographer repeats the half pressing of the shutter release button 26 and posture correction until any icon of the correcting direction is no longer displayed. When any icon of the correcting direction ceases to appear, the photographer fully presses the shutter release button 26.

The CPU 110 judges whether or not the shutter release button 26 has been fully pressed (step S17) and, if the button is found fully pressed, will process recording of picture data (step S18). Thus, the CPU 110 takes in picture data from the CCD 124, subjects them to a necessary signal processing, and record them on the recording medium 150. In this way, a picture in the composition intended by the user is taken.

In the sequence described so far, the processing of requested picture taking is completed. After this sequence, the CPU 110 turns off the zoom lock flag (step S19) to recover a state in which zooming is possible, and returns the shooting mode to the normal shooting mode.

As described above, the digital camera 10 embodying the present invention in this manner can, once the user determines the composition in which he desires a picture to be taken, can have the camera store the posture of the camera body 12 then (the basic posture). Then, necessary correction information for causing the camera to take the picture in that stored posture (the basis posture) is displayed on the monitor 30. By using this function, a picture in a composition intended by the user can be easily taken even when someone else is asked to release the shutter. Moreover, since only the correcting direction is displayed on the monitor 30 regarding the correction information, the user can clearly perceive the required extent of correction, and the person requested to take the picture would be in no way confused. Further, the visibility of the through image would not be obstructed either.

Although the icon of the correcting direction is supposed to be displayed superposed over the through image in this embodiment, the icon of the correcting direction may as well be displayed independently.

Also, the icons need not be displayed in the way exemplified in the description of this embodiment, but any other form of icon that can clearly indicate the required correcting direction would be acceptable.

Or where the camera body 12 is equipped with a loudspeaker, correction information can as well be notified aurally.

Incidentally, in the first embodiment of the present invention, whereas the icon of the correcting direction is supposed to be displayed only when any axis is inclined from the basic posture by either not less than +5 degrees or not more than −5 degrees, this is because any deviation within the range of ±5 degrees is set to be a tolerable error. Therefore, where more strict correction is required, the range of tolerance can be narrowed.

Figure 14:
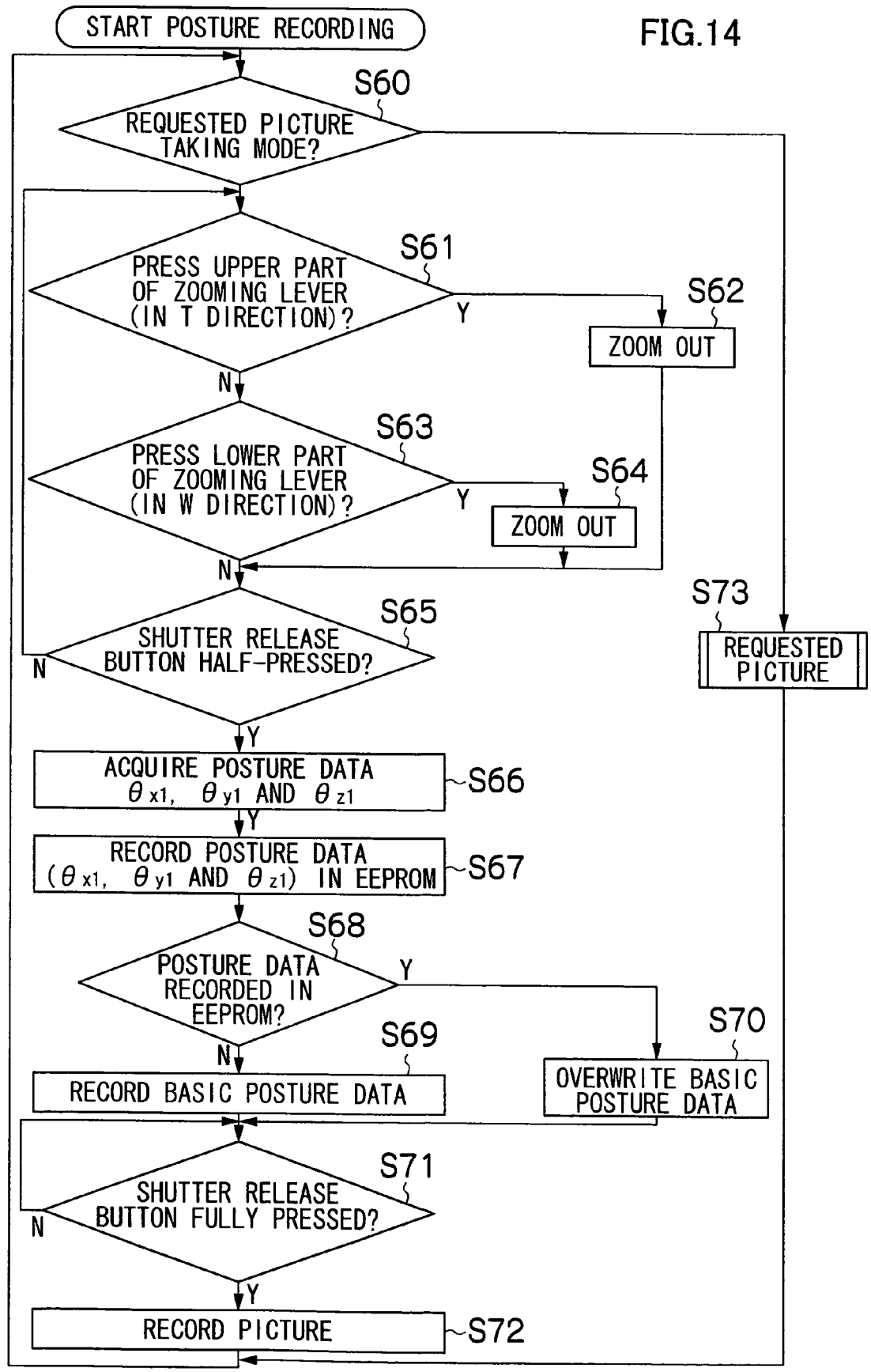
FIG. 14 is a flow chart of the procedure of image pickup processing by a digital camera, which is a second preferred embodiment of the invention.

FIG. 14 is a flow chart of the procedure of image pickup control by another digital camera 10, which is a second preferred embodiment of the present invention.

In the digital camera 10 embodying the present invention in this manner, when the shutter release button 26 is half-pressed in normal shooting, the posture data of the camera body 12 at the time are acquired from the posture detecting sensor 152 and stored in the EEPROM 118.

When the mode of the camera is set in the shooting mode with the mode selector switch 50, the CPU 110 judges whether or not the camera is set to the requested picture taking mode (step S60). Incidentally, the setting in the requested picture taking mode is accomplished on the shooting menu in the same way as in the first embodiment described above.

If it is judged here that the camera is not set in the requested picture taking mode, the camera will operate in the normal shooting mode as described below.

First, the CPU 110 judges whether or not the zooming lever 38 has been manipulated upward (in the telescopic direction) (step S61) and, if it judges in the affirmative, will issue a command to the zoom lens drive unit 144B to zoom in the zoom lens 14B (step S62). Or if it judges that the zooming lever 38 has not been manipulated upward (in the telescopic direction), the CPU 110 will judge whether or not the zooming lever 38 has been manipulated downward (in the wide angle direction) (step 63) and, if it judges in the affirmative, issue a command to the zoom lens drive unit 144B to zoom out the zoom lens 14B (step 64).

Next, the CPU 110 judges whether or not the shutter release button 26 is half-pressed (step S65); if it judges in the affirmative, will perform an AE/AF processing, and acquire posture data ($\theta_{x1}$, $\theta_{y1}$ and $\theta_{z1}$) from the posture detecting sensor 152 (step S66). Then it records the acquired posture data ($\theta_{x1}$, $\theta_{y1}$ and $\theta_{z1}$) in the EEPROM 118 as the basic posture data ($\theta_{x1}$, $\theta_{y1}$ and $\theta_{z1}$) (step S67).

Hereupon the CPU 110 judges whether or not there are the previously acquired basic posture data ($\theta_{x1}$, $\theta_{y1}$ and $\theta_{z1}$) in the EEPROM 118 (step S68). If it judges there are not, the CPU 110 writes as they are the basic posture data ($\theta_{x1}$, $\theta_{y1}$ and $\theta_{z1}$) acquired from the posture detecting sensor 152 (step S69). Or if the previously acquired basic posture data ($\theta_{x1}$, $\theta_{y1}$ and $\theta_{z1}$) still remain, the basic posture data ($\theta_{x1}$, $\theta_{y1}$ and $\theta_{z1}$) acquired from the posture detecting sensor 152 will be written over them (step S70).

After that, the CPU 110 judges whether or not the shutter release button 26 is fully pressed (step S71) and, if it judges in the affirmative, will process recording of picture data (step S72). Thus, it takes in the picture data from the CCD 124, subjects them to a necessary signal processing, and record them on the recording medium 150.

What has been described so far is the operating procedure of the normal shooting mode, and the posture data of the camera body are stored by the camera during the shooting process in this normal shooting mode. Therefore, where somebody else is to be asked to take a picture, it is necessary either to shoot, immediately before asking, a picture in the desired composition or determine a composition and half-press the shutter release button 26 in advance.

Figure 15:
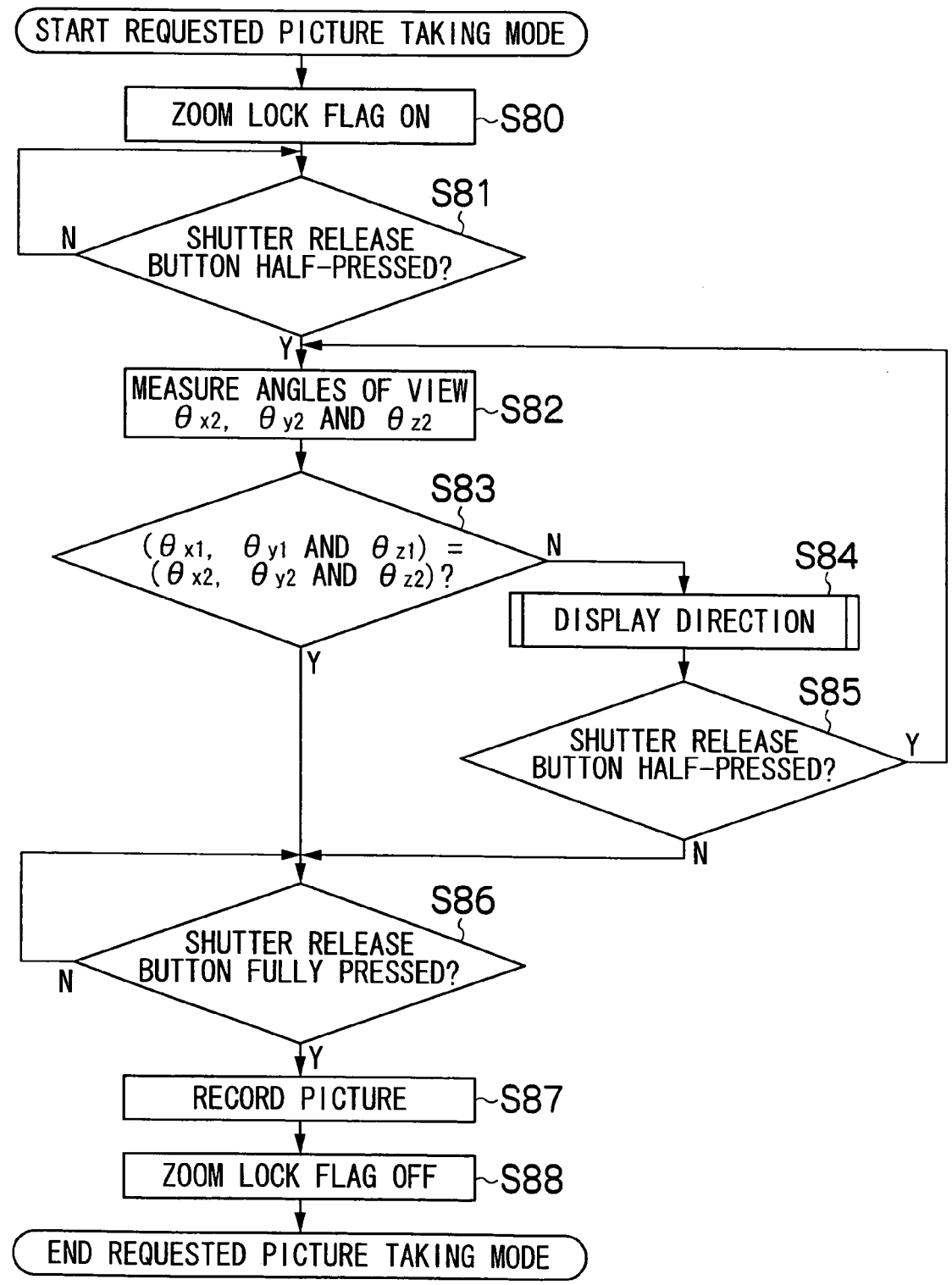
FIG. 15 is a flow chart of the procedure of image pickup processing in the requested shooting mode.

If it is judged at step S60 that the camera is set in the requested picture taking mode, the digital camera 10 will operate in the requested picture taking mode. In the requested picture taking mode, image pickup is processed in the sequence shown in FIG. 15.

First, in order to prevent the angle of view from being varied by an inadvertent manipulation of the zoom, the CPU 110 turns on a zoom lock flag to make zooming impossible (step S80).

The user hands over the camera in this state to somebody else whom he is to request to take a picture, and moves to a shooting point of his own choice. On the other hand, the person requested to take a picture, half-presses the shutter release button 26 and focuses on the object. The CPU 110 judges whether or not this shutter release button 26 is half-pressed (step S81); if the CPU 110 judges in the affirmative, it will perform an AE/AF processing and acquire posture data ($\theta_{x2}$, $\theta_{y2}$ and $\theta_{z2}$) from the posture detecting sensor 152 (step S82).

Then the CPU 110 compares the acquired posture data ($\theta_{x2}$, $\theta_{y2}$ and $\theta_{z2}$) and the basic posture data ($\theta_{x1}$, $\theta_{y1}$ and $\theta_{z1}$) stored in the EEPROM 118, and judges whether or not they are identical (step S83). If it judges they are not, it will perform a display processing of the correcting direction (step S84).

Incidentally, the display processing of the correcting direction is the same as in the first embodiment of the present invention description, and accordingly its description is dispensed with here.

The user (the person requested to take the picture) corrects the posture of the camera body 12 according to the icon information on the correcting direction displayed on the monitor 30.

The CPU 110 again judges whether or not the shutter release button 26 is half-pressed (step S85) and, if it judges that the shutter release button 26 is half-pressed, will return to step S82 to acquire posture data again from the posture detecting sensor 152. On the basis of the acquired posture data, the CPU 110 determines the correcting direction, and have the necessary icon for the determined correcting direction displayed. The user fully presses the shutter release button 26 when any icon of the correcting direction ceases to appear.

The CPU 110 judges whether or not the shutter release button 26 is fully pressed (step S86) and, if it judges in the affirmative, will process recording of picture data (step S87). Thus it takes in picture data from the CCD 124, subjects them to necessary signal processing, and record them on the recording medium 150. In this way, a picture in the same composition as that of the picture the user earlier took is taken.

After this sequence, the CPU 110 turns off the zoom lock flag (step S88) to recover a state in which zooming is possible, and returns the shooting mode to the normal shooting mode.

In this way, the digital camera 10 embodying the present invention in this manner can, if its shutter release button 26 is half-pressed in normally taking a picture, the posture data on the camera body 12 at the time are acquired from the posture detecting sensor 152, and stored in the EEPROM 118.

As in the foregoing first embodiment of the invention, this function makes it possible, even when another person is requested to take a picture on behalf of the user, to easily take a picture in the composition intended by the user.

Although in the second embodiment posture data are supposed to be stored in the EEPROM 118 when the shutter release button 26 is half-pressed in the normal shooting mode, it is also conceivable to have posture data stored in the EEPROM 118 when the shutter release button 26 is fully pressed, namely when a picture is taken.

While it is further supposed that, when the shutter release button 26 is half-pressed at the time of requested picture taking, the icon of the correcting direction is displayed on the monitor 30 on the basis of the posture data then acquired, it is also possible to periodically acquire posture data at short intervals of time, update the icon of the correcting direction from time to time and display the updated icon on the monitor 30.

Further, the posture detecting sensor for detecting the posture of the camera body 12 is not confined to what the second embodiment is supposed to have, but any other sensor can be used only if it can detect the inclination angles of three axes (the X, Y and Z axes).

While the present invention is applied to a digital camera capable of recording and reproducing still images in the preferred embodiments described above, the present invention can be similarly applied to digital cameras capable of recording and reproducing moving images in addition to still images.

Although the foregoing description referred to cases in which the present invention is applied to a digital camera, the present invention can be applied not only to digital still cameras but also to electronic devices having a photographic function (photographic apparatuses) including digital video cameras, camera-equipped cellular phones, camera-equipped PDAs and camera-equipped personal computers.

What is claimed is:

1. A photographic apparatus comprising:
   a posture detecting device which detects the posture of a body of the photographic apparatus wherein the posture is related to an inclination angle of body of the photographic apparatus as a first posture,
   a store instructing device which instructs storing of a first posture detected by said posture detecting device wherein a first inclination angle of the body of the photographic apparatus is stored,
   a posture storing device for storing a secondary posture detected by said posture detecting device as a second inclination angle of the body of the photographic apparatus in accordance with an instruction from said store instructing device,
   a discrepancy extent computing device which compares the first posture stored by said posture storing device and the secondary posture detected by said posture detecting device, and computes the extent of any discrepancy between the first posture and the secondary posture; and
   a correction information generating device for generating correction information for correcting the secondary posture to the first posture previously stored by said posture storing device based on the extent of the discrepancy computed by said discrepancy extent computing device.

2. The photographic apparatus according to claim 1, further comprising a shutter release button composed of a two-step stroke switch made up of half press and full press, wherein, if the shutter release button is pressed halfway, the discrepancy extent computing device computes the extent of the discrepancy and the correction information generating device generates the correction information based on the computed extent of the discrepancy.

3. The photographic apparatus according to claim 1, wherein said correction information generating device causes the correcting direction for the posture of the body of said photographic apparatus to be displayed on a display device as directional icons positioned on or adjacent to the edge of a display device, the directional icons corresponding to the direction of movement of the body of the photographic apparatus based on the extent of any discrepancy computed by said discrepancy extent computing device.

4. The photographic apparatus according to claim 2, wherein said correction information generating device causes the correcting direction for the posture of the body of said photographic apparatus to be displayed on a display device on the basis of the extent of any discrepancy computed by said discrepancy extent computing device, and correction information to be generated.

5. The photographic apparatus according to claim 3, wherein said photographic apparatus is an electronic camera which takes a picture with an image pickup element and records the picture so taken on a recording medium as picture data, a real-time picture taken by said image pickup element is displayed on said display device, and said correcting direction is superposed over the real-time picture in the display.

6. The photographic apparatus according to claim 4, wherein said photographic apparatus is an electronic camera which takes a picture with an image pickup element and records the picture so taken on a recording medium as picture data, a real-time picture taken by said image pickup element is displayed on said display device, and said correcting direction is superposed over the real-time picture in the display.

7. A posture correction information generating method in a photographic apparatus, comprising steps of:

detecting a secondary posture of a body of the photographic apparatus;

comparing the detected secondary posture of the body of the photographic apparatus with a first posture thereof acquired in advance and computing the extent of the discrepancy of the secondary posture from the first posture; and generating correction information intended to match the secondary posture of the body of the photographic apparatus with the first posture based on the computed extent of the discrepancy.

8. The posture correction information generating method of a photographic apparatus according to claim 7, wherein the secondary posture of the body of the photographic apparatus is detected in response to half press of a shutter release button.

9. The posture correction information generating method of a photographic apparatus according to claim 7, wherein the correction information is generated by displaying a correcting direction of the posture of the body of the photographic apparatus on a display device in the step of generating the correction information.

10. The posture correction information generating method of a photographic apparatus according to claim 8, wherein the correction information is generated by displaying a correcting direction of the posture of the body of the photographic apparatus on a display device in the step of generating the correction information.

11. The posture correction information generating method of a photographic apparatus according to claim 9, wherein the photographic apparatus is an electronic camera which takes a picture with an image pickup element and records the picture so taken on a recording medium as electronic picture data, a real-time picture taken by the image pickup element is displayed on the display device, and the correcting direction is superposed over the real-time picture in the display.

12. The posture correction information generating method of a photographic apparatus according to claim 10, wherein the photographic apparatus is an electronic camera which takes a picture with an image pickup element and records the picture so taken on a recording medium as electronic picture data, a real-time picture taken by the image pickup element is displayed on the display device, and the correcting direction is superposed over the real-time picture in the display.

13. The photographic apparatus according to claim 1, wherein the inclination angle is to be determined from the change in orientation of the body of the photographic apparatus.

14. The photographic apparatus according to claim 1, wherein after the posture detected by the posture detecting device is stored by the posture storing device, a zoom lock flag is turned on to prevent inadvertent zooming during the acquisition of the current posture.

15. The photographic apparatus according to claim 1, wherein the posture detecting device is an acceleration sensor.

16. The method of claim 7 wherein an acceleration sensor detects the posture of the body of the photographic apparatus.

17. A photographic apparatus comprising:

a posture detecting device that acquires and stores first and second orientations of the body of the photographic apparatus as a basic posture and a current posture, wherein a discrepancy between the first and second orientations is computed;

a generating device for generating correction information to correct the discrepancy; and a display device for displaying the correction information wherein the correction information are directional icons positioned on or adjacent to the edge of the display device, the directional icons corresponding to the direction of movement of the photographic apparatus based on the extent of the discrepancy computed by the computing device.

18. The photographic apparatus according to claim 17, wherein no directional icons are displayed on the display device if the basic posture and the current posture are identical.

19. A posture correction information generating method in a photographic apparatus, comprising steps of:

detecting a posture of the body of the photographic apparatus using a posture detecting device wherein the posture is related to an inclination angle of body of the photographic apparatus, storing a first posture detected by said posture detecting device wherein a first inclination angle of the body of the photographic apparatus is stored using a posture storing device, storing a secondary posture detected by said posture detecting device as a second inclination angle of the body of the photographic apparatus, comparing the first posture stored by said posture storing device and the secondary posture detected by said posture detecting device, and computing the extent of any discrepancy between the first posture and the secondary posture; and generating correction information for correcting the secondary posture to the first posture previously stored by said posture storing device based on the extent of the discrepancy computed by said discrepancy extent computing device.

20. The posture correction information generating method of a photographic apparatus according to claim 19, wherein the secondary posture of the body of the photographic apparatus is detected in response to half-press of a shutter release button.

21. The posture correction information generating method of a photographic apparatus according to claim 19, wherein the correction information is generated by displaying a correcting direction of the posture of the body of the photographic apparatus on a display device in the step of generating the correction information.

22. The posture correction information generating method of a photographic apparatus according to claim 20, wherein the correction information is generated by displaying a correcting direction of the posture of the body of the photographic apparatus on a display device in the step of generating the correction information.

23. The posture correction information generating method of a photographic apparatus according to claim 21, wherein the photographic apparatus is an electronic camera which takes a picture with an image pickup element and records the picture so taken on a recording medium as electronic picture data, a real-time picture taken by the image pickup element is displayed on the display device, and the correcting direction is superposed over the real-time picture in the display.

24. The posture correction information generating method of a photographic apparatus according to claim 22, wherein the photographic apparatus is an electronic camera which takes a picture with an image pickup element and records the picture so taken on a recording medium as electronic picture data, a real-time picture taken by the image pickup element is displayed on the display device, and the correcting direction is superposed over the real-time picture in the display.

25. The method of claim 19 wherein an acceleration sensor detects the posture of the body of the photographic apparatus.

26. A photographic apparatus comprising:

a posture detecting device which detects a first orientation of the body of the photographic apparatus as a basic posture, a store instructing device which instructs storing of said first orientation detected by said posture detecting device, a posture storing device for storing a second orientation of the body of the photographic apparatus detected by said posture detecting device as a current posture in accordance with an instruction from said store instructing device, a discrepancy extent computing device which compares the first orientation stored by said posture storing device and the second orientation detected by said posture detecting device, and computes the extent of any discrepancy between the first orientation and the secondary orientation;

a correction information generating device for generating correction information for correcting the secondary orientation to the first orientation previously stored by said posture storing device based on the extent of the discrepancy computed by said discrepancy extent computing device; and a display device for displaying the correction information wherein the correction information are directional icons positioned on or adjacent to the edge of the display device, the directional icons corresponding to the direction of movement of the photographic apparatus based on the extent of the discrepancy computed by the computing device.

27. The photographic apparatus according to claim 26, wherein no directional icons are displayed on the display device if the basic posture and the current posture are identical.

* * * * *